(12) United States Patent
Jouanet et al.

(10) Patent No.: US 8,072,417 B2
(45) Date of Patent: Dec. 6, 2011

(54) STAND-ALONE DEVICE, SYSTEM AND METHOD FOR NAVIGATING IN A SPACE HAVING AT LEAST THREE DIMENSIONS

(75) Inventors: Laurent Jouanet, Autrans (FR); Dominique David, Claix (FR); Yanis Caritu, Saint Joseph de Riviere (FR); Patrick Schermesser, Meylan (FR)

(73) Assignee: Commissariat a l'Energie Atomique, Paris (FR)

( * ) Notice: Subject to any disclaimer, the term of this patent is extended or adjusted under 35 U.S.C. 154(b) by 782 days.

(21) Appl. No.: 11/666,146

(22) PCT Filed: Oct. 21, 2005

(86) PCT No.: PCT/FR2005/002623
§ 371 (c)(1),
(2), (4) Date: Sep. 24, 2007

(87) PCT Pub. No.: WO2006/045934
PCT Pub. Date: May 4, 2006

(65) Prior Publication Data
US 2008/0074385 A1   Mar. 27, 2008

(30) Foreign Application Priority Data
Oct. 22, 2004   (FR) ..................................... 04 11297

(51) Int. Cl.
*G09G 5/00*   (2006.01)
(52) U.S. Cl. .......................... 345/156; 345/163; 345/164
(58) Field of Classification Search ........... 345/156–173
See application file for complete search history.

(56) References Cited

U.S. PATENT DOCUMENTS

| | | | |
|---|---|---|---|
| 5,825,350 A | 10/1998 | Case, Jr. et al. | |
| 5,923,318 A | 7/1999 | Zhai et al. | |
| 6,069,594 A | 5/2000 | Barnes et al. | |
| 6,072,476 A * | 6/2000 | Harada et al. | 345/204 |
| 6,191,775 B1 * | 2/2001 | Suzuki | 345/167 |
| 6,597,347 B1 * | 7/2003 | Yasutake | 345/173 |
| 6,720,949 B1 | 4/2004 | Pryor et al. | |
| 7,489,299 B2 * | 2/2009 | Liberty et al. | 345/163 |
| 2002/0140698 A1 | 10/2002 | Robertson et al. | |

FOREIGN PATENT DOCUMENTS

DE            006 009 U1       1/2003
(Continued)

OTHER PUBLICATIONS

Casiez et al., "The DigiHaptic, a New Three Degrees of Freedom Multi-finger Haptic Device" Patent Application—(2 pgs).

(Continued)

*Primary Examiner* — Duc Dinh
(74) *Attorney, Agent, or Firm* — Brinks Hofer Gilson & Lione

(57) ABSTRACT

A stand-alone device for navigating in a space having at least three dimensions comprises a housing capable of being manipulated by a user. The housing houses means for generating signals that represent the inclination of the housing according to its pitch axes, rolling axes and yaw axes, and houses at least one isometric device that generates a control signal of a bi-directional displacement according to at least one axis of said space. The invention is used, in particular, for navigating in a virtual space.

18 Claims, 19 Drawing Sheets

FOREIGN PATENT DOCUMENTS

| | | |
|---|---|---|
| EP | 1 276 073 A2 | 1/2003 |
| EP | 1 437 641 A1 | 7/2004 |
| FR | 2 838 185 | 10/2003 |
| JP | 08161103 A | 6/1996 |
| JP | 10207623 A | 7/1998 |
| JP | 11 211474 A | 8/1999 |
| WO | WO 92/08208 | 5/1992 |
| WO | WO 00/14676 | 3/2000 |
| WO | WO 00/36376 | 6/2000 |

OTHER PUBLICATIONS

Casiez et al., "Elastic Force with a New Multi-finger Haptic Device: The DigiHaptic", Patent Application—(pp. 121-134).

Fukatsu et al., "Manipulation of Viewpoints in 3D Environment Using Interlocked Motion of Coordinate Pairs", Interact 2003, Ninth IFIP TC13 International Conference Interaction—Sep. 1-5, 2003, Zurich, Switzerland, (pp. 327-334).

Zhai, Shumin, "Investigation of Feel for 6DOF Inputs: Isometric and Elastic Rate Control for Manipulation in 3D Environments"—Human Factors and Ergonomics Society $37^{th}$ Annual Meeting—1993—(5 pgs).

PCT International Search Report.

PCT Preliminary Examination.

PCT Written Opinion.

PCT Request.

English Translation of PCT International Preliminary Report on Patentability.

Office Action mailed Nov. 9, 2010, with English translation, 7 pgs.

\* cited by examiner

STAND-ALONE DEVICE, SYSTEM AND METHOD FOR NAVIGATING IN A SPACE HAVING AT LEAST THREE DIMENSIONS

PRIORITY CLAIM

This application is a nationalization of PCT Application Serial No. PCT/FR2005/002623, filed Oct. 21, 2005, and claims priority to French Patent Application No. 0411297, filed Oct. 22, 2004.

TECHNICAL FIELD

The present invention concerns a stand-alone device for navigating in a space having at least three dimensions.

It also concerns a navigation system and a method for navigating in a space having at least three dimensions.

The term navigation encompasses both exploration and searching in a virtual space and the inspection and manipulation of objects in a space having a plurality of dimensions. In this case the space may be either a virtual space or a real space, navigation in a virtual space more particularly concerning the manipulation of a camera or of an aircraft of the drone type.

BACKGROUND

In a virtual space, navigation consists in moving an object or a point of view relative to the virtual space. In particular, it may be a question of manipulating a mobile object in the virtual space or of moving an observation point in a virtual space. This type of navigation is used in particular in video games in a virtual space having three dimensions or for exploring a database having three dimensions, such as a geographical database.

Navigation in spaces having three dimensions is generally effected with the aid of peripheral devices placed on a work surface.

To enable navigation with six degrees of freedom in a space having three dimensions, systems are known requiring the simultaneous use of both hands to manipulate independently two navigation devices.

Accordingly, for example, it is routine to associate for navigation in a virtual space a keyboard with a peripheral mobile in a plane such as a standard mouse or a peripheral mobile in space of the joystick type.

The association of a standard mouse with a second navigation device of the joystick type may also be envisaged.

These different methods of navigation requiring the simultaneous use of both hands of the user make navigation not very intuitive. Learning the handling of these navigation devices is difficult and takes a long time, and may constitute a major impediment for many users. Moreover, these navigation devices generally require the use of a work surface for them to work.

This type of navigation technique is described in particular in the U.S. patent publication No. US 2002/14 0698.

There are also known navigation devices sensitive to six degrees of freedom corresponding to three rotations and three translations in space. One such device is described in the document U.S. Pat. No. 5,923,318, for example.

In such a device, navigation is obtained by movement of the device in space. It is a question of an isotonic device. The movements of the device are then translated into diverse actions of movement in the real or virtual navigation space.

However, because of the coupling of the different degrees of freedom in the same isotonic device, this type of navigation device is unsuitable for navigation in a space having three dimensions.

SUMMARY

An object of the present invention is to overcome the drawbacks cited above and to propose a navigation device that can be immediately mastered by the user for navigation in a space having at least three dimensions.

To this end, the present invention is directed firstly to a stand-alone device for navigating in a space having at least three dimensions, including a casing adapted to be manipulated by a user, incorporating means for generating signals representing the inclination of the casing with respect to its pitch, roll and yaw axes.

According to the invention, this casing incorporates at least one isometric device generating a signal for controlling a bidirectional movement with respect to at least one axis of said space.

Thus this stand-alone navigation device consists of two decoupled systems grouped together in the same casing. A first system is sensitive to isotonic movements of rotation in space of the casing incorporating the system and a second system consists of at least one isometric device for generating an action in the navigation space.

Thanks to the decoupling of these actions in a common casing manipulated by a user, the latter can intuitively master navigation in a space having three dimensions.

The isometric device is preferably sensitive to a force exerted along at least one axis of said isometric device and the movement control signal is preferably a signal representing the force exerted along said axis.

Such an isometric device produces a gradual action with respect to one degree of freedom in the space having at least three dimensions, proportional to the force exerted along one axis of the isometric device.

Such an isometric device therefore takes into account the force exerted on the device by the user in order to improve the performance and the realism of navigation in the space having at least three dimensions.

According to a preferred feature of the invention, the isometric device is sensitive to a force exerted along three axes and adapted to generate signals for controlling a bidirectional movement with respect to three axes of said space.

Thanks to this isometric device, the stand-alone navigation device enables navigation with six degrees of freedom in a space having at least three dimensions through the decorrelated association of an isometric device and an isotonic device in the same casing.

In one embodiment of the invention, the casing has a substantially parallelepipedal shape, the isometric device being disposed on an upper face of the casing and adapted to be operated by the thumb of a user holding said casing in one hand.

Alternatively, this casing has a substantially parallelepipedal shape, the isometric device being disposed on a lateral face of said casing and adapted to be operated by a finger of the user holding said casing in one hand.

Such a stand-alone navigation device offers the user intuitive gestures and ergonomic hand movements. By manipulating a stand-alone navigation device with only one hand, it is possible to navigate in a space having at least three dimensions or, correlatively, to manipulate intuitively an object in a space having at least three dimensions.

A second aspect of the present invention relates to a system for navigating in a space having at least three dimensions, comprising a stand-alone navigation device according to the invention and processor means adapted to take into account the signals representing the inclination of the casing and the control signal to generate at least one movement in the space having at least three dimensions.

This navigation system has features and advantages similar to those of the navigation device that it uses.

It also has the following features:

1) the signals representing the inclination of the casing are adapted to generate three bidirectional movements in the navigation space;

2) the signals representing the inclination of the casing are adapted to generate signals for controlling bidirectional rotation in the navigation space;

3) the control signal is adapted to generate bidirectional movements with respect to three axes of said navigation space;

4) the control signal is a signal representing a force exerted along at least one axis of the isometric device of the stand-alone navigation device and the control signal is adapted to generate a movement in the space depending on the force exerted along that axis;

5) the movement in the space depends on a comparison of the signal representing the force exerted along that axis with a predetermined threshold value;

6) the signal representing the force exerted along that axis is adapted to generate a bidirectional translation in the navigation space.

Finally, a third aspect of the invention relates to a method of navigating in a space having at least three dimensions.

According to the invention, this method comprises the following steps:

a) acquisition of signals representing the inclination of a casing with respect to the pitch, roll and yaw axes;

b) acquisition of a signal for controlling a bidirectional movement in the navigation space along at least one axis of that space, generated by an isometric device incorporated in said casing;

c) generation of at least one bidirectional movement in the navigation space from signals representing the inclination of the casing; and d) generation of at least one second bidirectional movement in said navigation space from said control signal.

This navigation method includes in particular:

a) steps of generation of signals for controlling bidirectional rotation in the space from the signals representing the inclination of the casing and a step of generation of signals for controlling bidirectional translation in the space from the control signals generated by the isometric device;

b) steps of generation of signals for controlling bidirectional rotation and bidirectional translation in the space from the signals representing the inclination of the casing and a step of generation of signals for controlling translation in the space from the control signals generated by the isometric device;

c) steps of generation of signals for controlling two bidirectional rotations and a bidirectional translation in the space from the signals representing the inclination of the casing and a step of generation of signals for controlling translation in the space from the control signals generated by the isometric device;

d) steps of generation of signals for controlling a bidirectional rotation and two bidirectional translations in the space from the signals representing the inclination of the casing and a step of generation of signals for controlling bidirectional translation in the space from the control signals generated by the isometric device;

e) steps of generation of signals for controlling three bidirectional rotations in the space from the signals representing the inclination of the casing and a step of generation of signals for controlling translation in the space from the control signals generated by the isometric device;

f) steps of generation of signals for controlling three bidirectional rotations in the space from the signals representing the inclination of the casing and a step of generation of signals for controlling three bidirectional translations in the space from the control signals generated by the isometric device.

Other features and advantages of the invention will become more apparent in the course of the following description.

DETAILED DESCRIPTION

Figure 1:
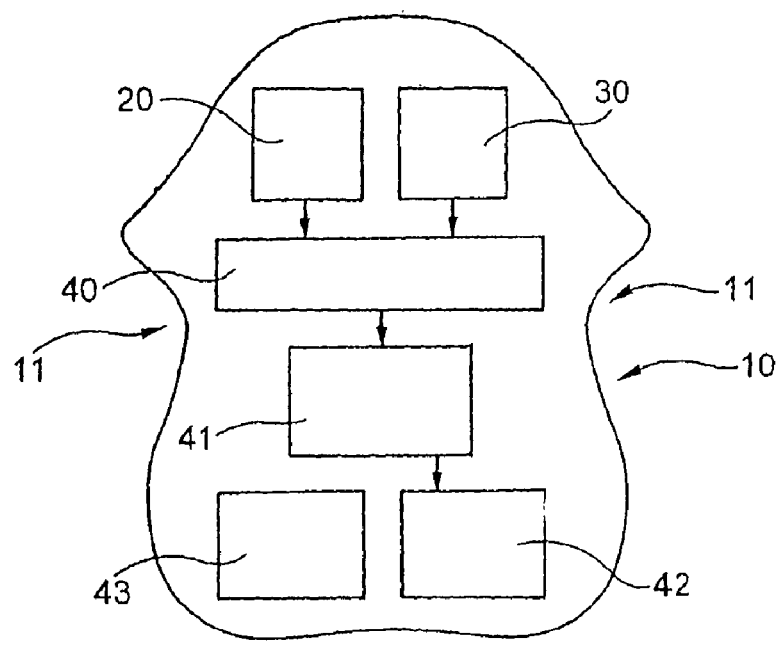
FIG. 1 is a block schematic illustrating a stand-alone navigation device conforming to one embodiment of the invention.

One embodiment of a stand-alone navigation device according to the invention will be described first with reference to FIG. 1.

That device takes the form of a casing 10 that can be manipulated by a user.

This casing will be described later. Note however that it may have an exterior shape enabling a good grip by the user.

This casing primarily incorporates isotonic sensors 20 with three degrees of freedom and at least one isometric sensor 30.

The isotonic sensors 20 are adapted to generate signals representing the inclination of the casing with respect to the pitch, roll and yaw axes. These isotonic sensors 20 will be described in more detail hereinafter.

The isometric sensor is also adapted to generate a signal for controlling an action in a navigation space.

It will be remembered that isotonic sensors are devices adapted to generate signals depending on the movement of the device. Isometric devices are devices sensitive to a pressure or a force. They are adapted to sense a force applied to the sensor but do not move perceptibly.

Examples of isotonic and isometric sensors will be given hereinafter.

The navigation device 10 further includes, connected to the outputs of its sensors 20, 30, a converter 40 adapted to convert analog signals into digital signals for processing them and transmitting them to processing means.

A microcontroller 41 and a radio-frequency transmission device 42 are additionally associated with the converter 40.

A battery system 43 is also provided as an onboard energy supply for the navigation device 11.

Of course, the transmission system 42 could be replaced by any other type of data transmission, possibly even by a cable transmission system.

Figure 2:
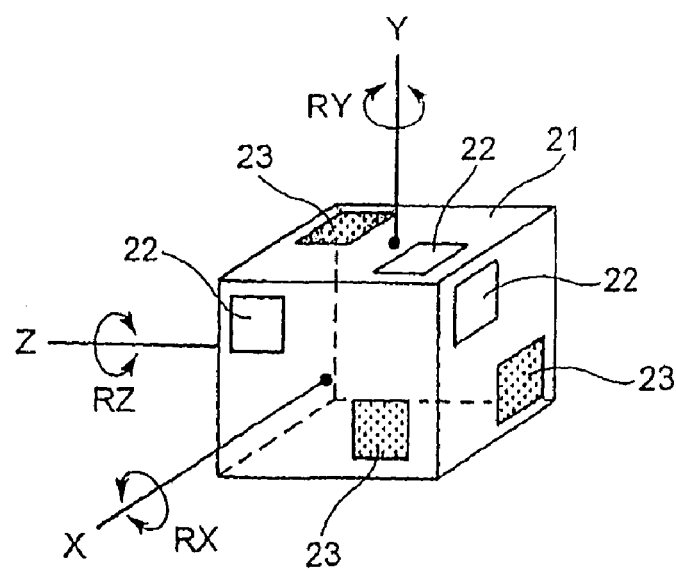
FIG. 2 is a schematic illustrating an isotonic sensor of the device from FIG. 1.

One example of an isotonic sensor with three degrees of freedom will be described next with reference to FIG. 2.

For a detailed description of such an isotonic sensor French patent No. FR 2 838 185 in the name of the applicant may advantageously be referred to.

In particular, this sensor takes the form of a cubic support 21. This support serves as a positioning reference and defines a system of orthogonal axes X, Y and Z constituting a frame of reference having three dimensions.

In this embodiment, the sensor includes three accelerometers 22 and three magnetometers 23.

From output values AX, AY and AZ supplied by the accelerometers 22 and output values MX, MY and MZ supplied by the magnetometers 23 it is possible to determine by calculation, in a frame of reference in which the axes X and Y are horizontal and the axis Z is vertical, the value of the elevation RX on the pitch axis X, the value of the twist RZ on the roll axis Y and the value of the azimuth RZ on the yaw axis Z.

The calculation of the values RX, RY and RZ is described in detail in French patent No. FR 2 838 135 in particular.

In practice, it is possible to determine these values from a single sensor sensitive to gravity, such as an accelerometer, and a single sensor sensitive to a magnetic field, such as a magnetometer.

However, for reasons of the robustness of the measurements, it is preferable to use at least two accelerometers and at least two magnetometers, and in this embodiment three accelerometers 22 and three magnetometers 23.

It will be noted in this connection that this navigation device is a stand-alone device in the sense that it includes the means necessary for the generation of the rotation angles RX, RY, RZ from an absolute frame of reference such as a geophysical frame of reference (defined by gravity field or the terrestrial magnetic field).

Accordingly it is not necessary to provide equipment in the environment in which the navigation device is used to calculate the angles from an external frame of reference (using a magnetic or optical field generator, for example).

These isotonic sensors for determining the angular position in space of the navigation device and thus providing measurements of inclinations and/or angles are associated with one or more isometric devices 30.

In a first embodiment of the invention, this isometric device may consist of a single push-button activation whereof generates a signal commanding an action in the navigation space, for example a unidirectional movement, such as a unidirectional translation along an axis of the navigation space, for example.

If a bidirectional action is required, it may be possible to provide for the type of actuation of the push-button (a click or a double-click) to generate a signal commanding a predetermined action and the converse of that action in the navigation space.

More simply, it is possible to provide two push-buttons as isometric sensors for obtaining an action and its converse, for example a bidirectional movement in the navigation space.

Of course, the two push-buttons of the navigation device may be associated with actions that are entirely different and not merely the converse of each other, although that type of device would not be very ergonomic from the point of view of the user.

According to another embodiment of the invention, the isometric device may be sensitive to a force exerted along an axis of this isometric device such that the control signal generated by this device will be a signal representing the force exerted along that axis.

It is thus possible to control a gradual action in the navigation space using such an isometric device.

This isometric device may consist of a potentiometer, for example.

Accordingly, a potentiometer being sensitive to a bidirectional force in one of these directions, the isometric device can generate a signal for controlling a gradual bidirectional action as a function of the intensity of the force exerted on the isometric device.

If such a gradual bidirectional action is required with respect to another axis of the navigation space, it is possible to equip the navigation device with a second potentiometer.

According to a third embodiment of the invention, the isometric device may directly consist of a sensor sensitive to a force in three directions. Such a sensor is shown in the European patent publication No. EP 1 275 949, for example.

This type of force sensor includes a rigid rod intended to be loaded by a finger of the user and a head connected to the rod. That head includes a deformable element which carries measuring means of the strain gauge type connected in a Wheatstone bridge circuit. These measuring means therefore generate signals depending on the deformation or strain imposed by the deformable element via the rigid rod.

This "nail" type of sensor, as it is called, is sensitive in two of its three directions to a bidirectional force exerted along these axes and, on the third axis, to a force exerted in only one direction.

Such an isometric device is thus adapted to generate signals for controlling an action in the three dimensions of that navigation space, an action with respect to one of the axes of that space being only unidirectional.

These actions are all gradual actions if they depend on the force exerted on and measured in the isometric device.

By associating this isometric device with the isotonic device described hereinabove, the navigation device provides access to the six degrees of freedom necessary for navigation in a space having three dimensions.

To obtain a bidirectional action on the final axis of this space, it is possible to associate with the nail type force sensor a sensor as described hereinabove consisting of a push-button.

There will be described now with reference to FIGS. 3A to 3C and 4A to 4C two practical embodiments of such a stand-alone navigation device particularly well adapted to the ergonomics of the user.

As shown well in the figures, the casing has a substantially parallelepipedal shape with a top face 12, a bottom face 13 and four lateral faces 14, 15, 16 and 17.

The bottom face 13 is preferably a plane face to enable the device to be placed stably on a work surface, although it is used in free space.

Figure 4A:
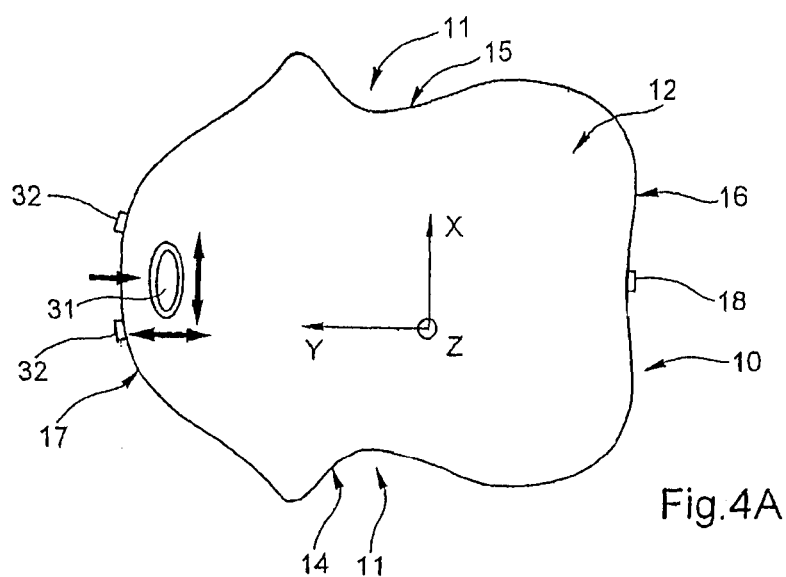
FIGS. 4A, 4B and 4C illustrate one embodiment of a casing of the stand-alone navigation device conforming to a second embodiment of the invention.
Figure 4B:
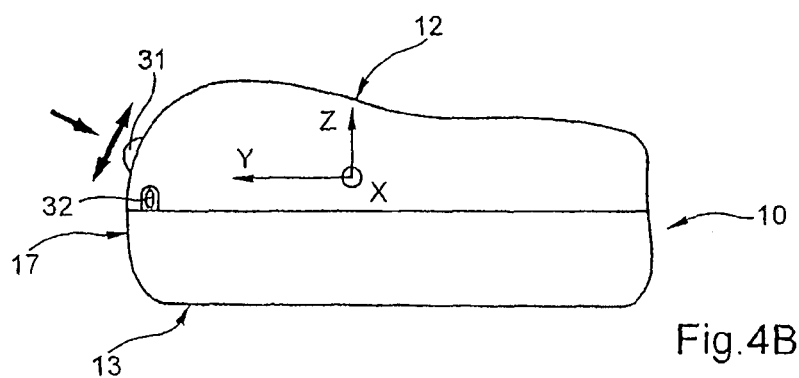
Figure 4C:
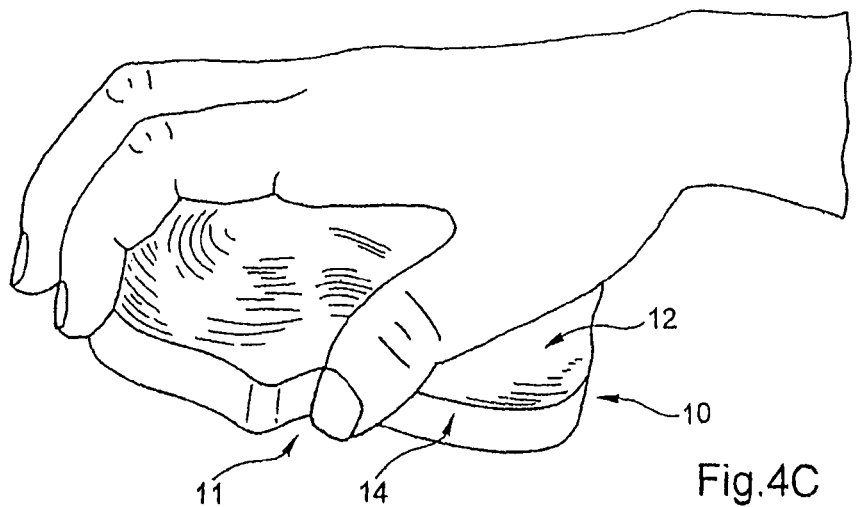

The top face 12 may be slightly domed to facilitate the user holding it in his hand, in particular if the latter grasps the device by its top face 12, as shown in FIG. 4C.

The lateral faces 14 and 15 constituting the sides of the device 10 may feature a cut-out 11 to facilitate holding it and the placement of the fingers of the user as shown in FIG. 4C, for example.

The rear face 13 of the device 10 is substantially plane. In these embodiments it includes an on/off button.

In this embodiment, the casing includes a plurality of isometric devices 31, 32.

The isometric device 31 consists of a nail type force sensor sensitive to a force exerted along three axes of the device 31. As shown well by the arrows in FIGS. 3A, 3B, 4A and 4B, this isometric device is sensitive to two bidirectional and mutually perpendicular actions in the general plane of the isometric device 31 and a unidirectional action perpendicular to that plane.

Figure 3A:
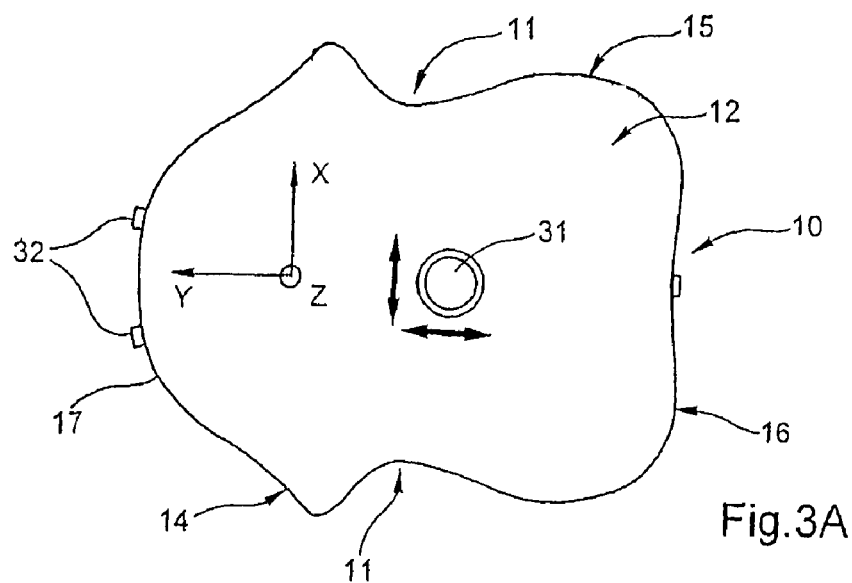
FIGS. 3A, 3B and 3C illustrate one embodiment of a casing of the stand-alone navigation device conforming to a first embodiment of the invention.
Figure 3B:
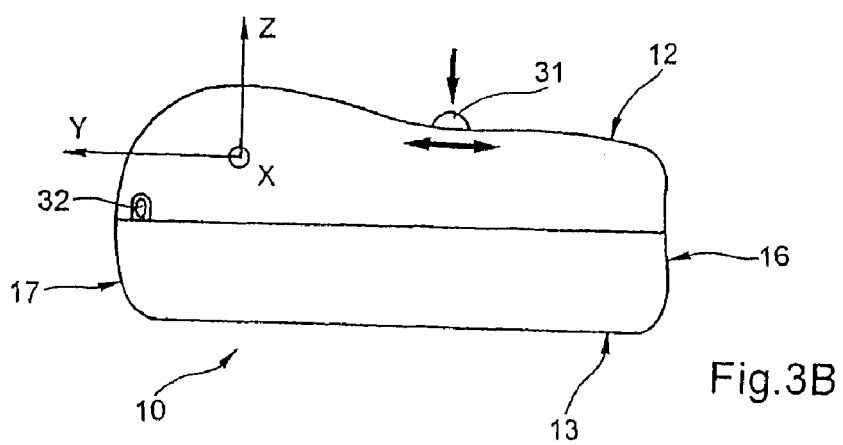
Figure 3C:
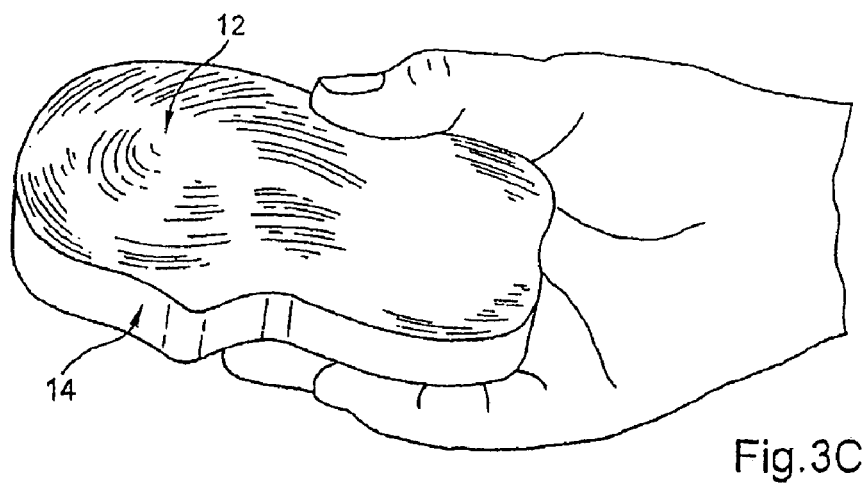

In the embodiment shown in FIGS. 3A to 3C, the isometric device is disposed on the top face 12 of the casing. Accordingly, as shown in FIG. 3C, that device is adapted to be operated by the thumb of a user who holds the casing in his hand. The rod of the force sensor is disposed perpendicularly to the top face 12 of the casing.

In the embodiment shown in FIGS. 4A and 4C, the isometric device 31 is disposed on a lateral face of the casing, here on the front face 17 of the casing.

As shown in FIG. 4C, this device is adapted to be operated by a finger of the user holding the casing in one hand, for example by the index finger or the ring finger. Here the rod of the force sensor is disposed perpendicularly to the front lateral face 17 of the casing.

Of course, the interior of the casing 10 incorporates an isotonic device 20 as described hereinabove for detecting the inclination of the casing about all three of the pitch, roll and yaw axes.

In these embodiments, the stand-alone navigation device 10 further includes two push-buttons 32 constituting supplemental isometric devices for also generating signals commanding an action in a navigation space.

These push-buttons 32 are operated by the fingers of the user holding the casing.

There is obtained in this way an optimized navigation device offering the user intuitive gestures and ergonomic hand movements. This device can be manipulated by only one hand and the fingers of that hand, at the same time as offering the richness of the possibilities of navigation in a space having three dimensions.

There will be described now examples of systems for navigating in a space having at least three dimensions using the navigation device described hereinabove.

Generally speaking, a system conforming to the invention for navigation in a space having at least three dimensions comprises a stand-alone navigation device as described hereinabove and processing means adapted to take into account the signals representing the inclination of the casing and the control signal coming from the isometric device to generate at least one action in the space having at least three dimensions.

Figure 5:
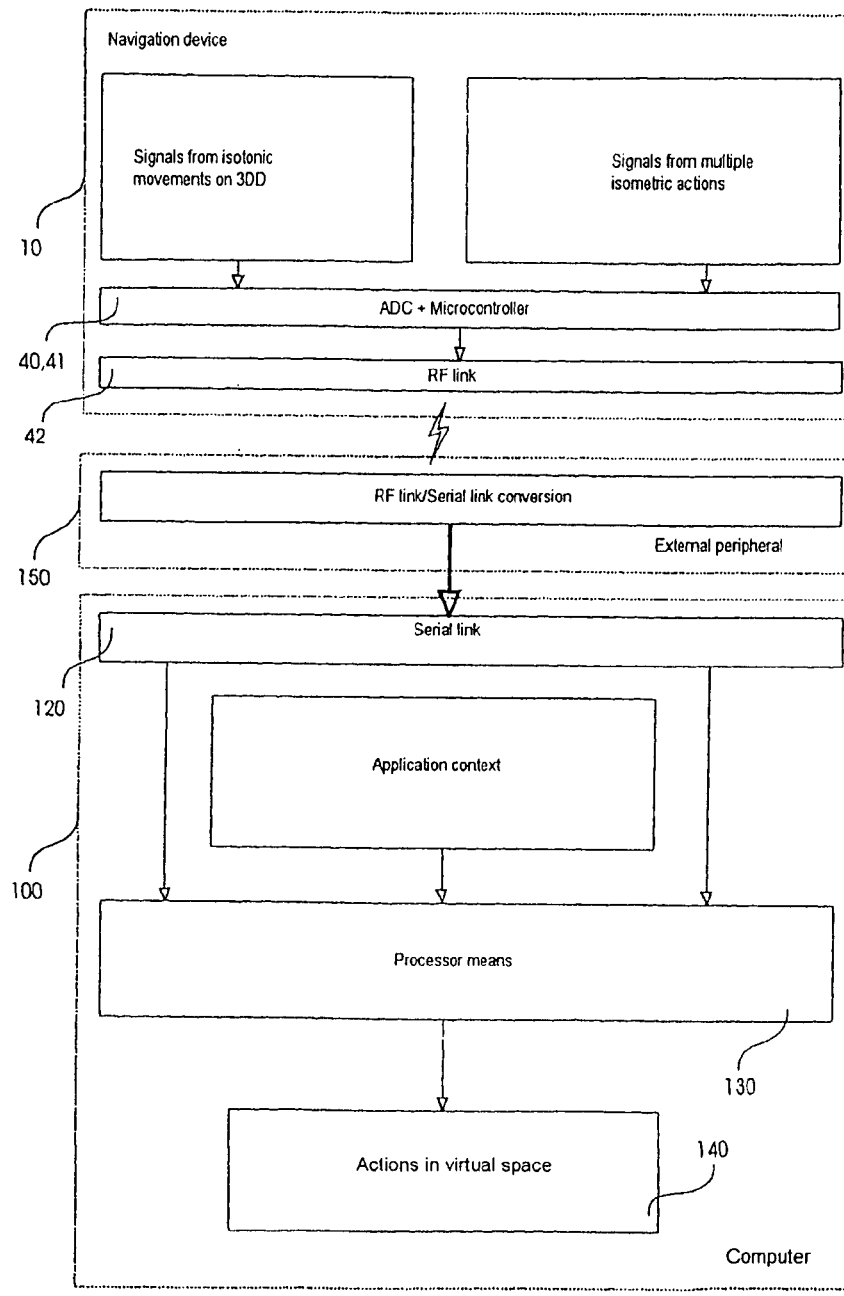
FIG. 5 is a block schematic illustrating a navigation system according to the invention applied to a virtual space.

There will be described first with reference to FIG. 5 a system for navigation in a virtual space.

A virtual space consists of a database having more than two dimensions for representing a real space. This type of virtual space is used in particular for video games but also for simulators. It may also be used to represent information databases such as geographical or cartographical databases.

This virtual space is defined on the basis of an application context stored in a computer 100.

Thus the navigation system includes a converter 110 adapted to convert the radio-frequency link into a serial link. This converter 110 transmits the signals stemming from the isotonic movements of the navigation device 10 and the signals stemming from actions on the isometric devices equipping the navigation device 10 via a serial link 120 of the computer 100. Thus these signals are transmitted to the processing means 130 together with the data stored in the application context.

The processing means 130 are adapted to merge the data supplied by the sensors and to analyze the application context, and in particular the type of content having two or three dimensions, the type of navigation to be performed and where applicable certain environmental parameters such as the altitude.

The processing means are adapted to calculate from the data supplied by the sensors the angles of rotation of the navigation device 10 and to determine a set of actions to be performed as a function of the data received, the rotation angles calculated, the analysis of the context and in particular the type of navigation to be performed.

The actions are then effected in the virtual space 140, taking the form of a movement of a point of view or of an object on a virtual representation of the space displayed on a screen of the computer 100, for example.

There will now be described with reference to FIGS. 6 to 17 various examples of navigation in a virtual space, and in particular in a virtual space having three dimensions.

In all the navigation methods described hereinafter, the following definitions and references apply:

For the stand-alone navigation device 10, it is possible to consider reference values at the input of the processing means that correspond to a reference position in the real space of the navigation device 10.

Thus there are defined for the accelerometers 22 the data AXref, AYref and AZref and for the magnetometers 23 the reference values MXref, MYref and MZref.

From these reference values of the accelerometers and magnetometers there are calculated in the manner explained hereinabove the values of inclination of the navigation device with respect to the three axes in space, corresponding to the rotations RXref, RYref and RZref.

If the isometric sensors are sensitive to a force, for example potentiometers or nail type force sensors, it is also possible to determine input reference values VP1ref and VP2ref for the potentiometers or CLXref, CLYref and CLZref for a nail type force sensor corresponding to the amplitude of the force measured with respect to the three axes X, Y and Z of the nail type force sensor in the reference position of the navigation device 10.

To this input reference data supplied to the processing means there corresponds a reference position in the virtual space.

Whatever the system used, in a virtual space having three dimensions, angular coordinates ROTX, ROTY and ROTZ are used representing the three rotations with respect to the axes X, Y and Z defining the three dimensions of the virtual space and the positions POSX, POSY and POSZ in the three planes X, Y and Z of the object to be considered in the virtual space delimited by the application.

In practice, if navigation in the virtual space consists in exploring that space, the user is treated as a spectator inside the virtual space. The angular coordinates and the positions determined in this way at the output of the processing means are used to modify the position of a camera through which the spectator views the virtual space.

If navigation in the virtual space consists in observing or manipulating a virtual object in that space, the user is treated as a spectator external to the virtual space itself. The output data is then applied to the position of the object itself relative to the virtual space.

There are thus defined as output values a reference position of the camera or of the object in the virtual space corresponding to the angular position output values ROTXref, ROTYref and ROTZref and the position output values POXref, POSYref and POSZref.

Furthermore, the following variables are defined hereinafter:

DAX: difference between the measured value and the value stored on initialization of the application for one of the isotonic sensors sensitive to a rotation with respect to the axis X: DAX=AX−AXref.

It will be noted that it is equally possible to use the differences MX−MXref or RX−RXref. For reasons of robustness, it is nevertheless preferable to use the raw value coming from the accelerometer.

DAY: difference between the measured value and the value stored on initializing the application for one of the sensors sensitive to a rotation with respect to the axis Y: DAY=AY−AYref.

As before, MY−MYref or RY−RYref could equally be used.

DRX: difference between the calculated instantaneous value of the angle on the axis X and that stored on initialization of the application.

DRY: difference between the calculated instantaneous value of the angle on the axis Y and that stored on initialization of the application.

DRZ: difference between the calculated instantaneous value of the angle on the axis Z and that stored on initialization of the application.

DPT: difference between the measured value of PT and that stored on initialization of the application.

DCLX: difference between the measured value of CLX and that stored on initialization of the application.

DCLY: difference between the measured value of CLY and that stored on initialization of the application.

DCLZ: difference between the measured value of CLZ and that stored on initialization of the application.

KV: multiplier coefficient for the speed of movement dependent on the altitude POSZ, i.e. on the position of the object on the vertical axis Z in the virtual space: KV=POSZ/500 for example.

Of course other multiplier coefficients of more sophisticated function could be used involving both the altitude and the height of the ground to calculate the speed.

KZ: speed multiplier coefficient for the movement in altitude: KZ=POSZ/1000 for example.

KL: speed multiplier coefficient for the lateral movement dependent on the altitude: KL=POSZ/2000 for example.

FLTSPD: flight speed parameter. This parameter may be fixed and predetermined by the system if the isometric sensors are push-buttons. It may equally be variable and depend on the output value of a potentiometer or on one of the values CLX, CLY or CLZ at the output of a nail type force sensor. Thus this flight speed parameter may in this case be modified as a function of the intensity of the force exerted by the user on the isometric device along an axis of application of that force.

DeltaX: vertical orientation of the camera. In many types of application, and in order to enhance the visual comfort of the user seated at his computer, the position of the camera is fixed with a downward inclination of about ten degrees, in order to increase the field of view during movement in the virtual space. This orientation provides a better visualization of the virtual space. In this case, the angular coordinate ROTX=DeltaX.

DeltaY: horizontal orientation of the camera. In certain applications it is preferable for the camera to remain horizontal in order to enhance visual comfort. In this case, it is not a question of simulating a movement, such as the flight of an aircraft, but rather of rendering that movement as comfortable as possible, without taking into account real factors that may lead to a horizontal modification of the point of view. The horizontal orientation of the camera is then fixed so that its angular coordinate ROTY=DeltaY. In other types of application, the inclination of the camera defined by its angular coordinate ROTY may be variable.

ThresholdAx: threshold of adjustment with respect to the axis X of the navigation device. This threshold enables small movements of the navigation device to be ignored provided that they remain below this threshold, in order to preserve a stable position when navigating in the virtual space and not to react to unintentional trembling of the user manipulating the stand-alone navigation device.

ThresholdAy: threshold of adjustment with respect to the axis Y of the stand-alone navigation device, as before enabling unintentional trembling of the user to be ignored.

Using these adjustment thresholds prioritizes comfort when navigating in a virtual space, possibly to the detriment of realism.

CoefAx: coefficient for adjusting the movement with respect to the vertical axis in a manner proportional to the altitude. In the application examples described hereinafter, the real altitude is used. There may instead be used the height relative to the ground, subject to a threshold above which the real altitude is taken into account.

AzimuthStep: unit step of movement in the case of rotation in the horizontal plane, about the vertical axis Z.

PIVOT: variable for indicating the effecting of an immediate change of direction.

DeltaZ: difference between the instantaneous and initial angular positions of the camera measured in the horizontal plane.

ResultAngleMax: maximum value that a calculated rotation angle may assume, for example 360 degrees.

ResultAngleMin: minimum value that a calculated rotation angle may assume, for example 0 degree.

RotationDirection: defines the direction of rotation of the camera at any given time.

There will be described first of all with reference to FIG. 6 a method for navigating in a virtual space having three dimensions. In this embodiment, it is a question of simulating a bird flight type movement for exploring a virtual environment. It is therefore a question of modifying the shooting point and the angle of a camera through which the user views the virtual space.

This mode of consultation must make it possible to stop, move forward or back, turn and rise or descend in the virtual space.

Figure 6:
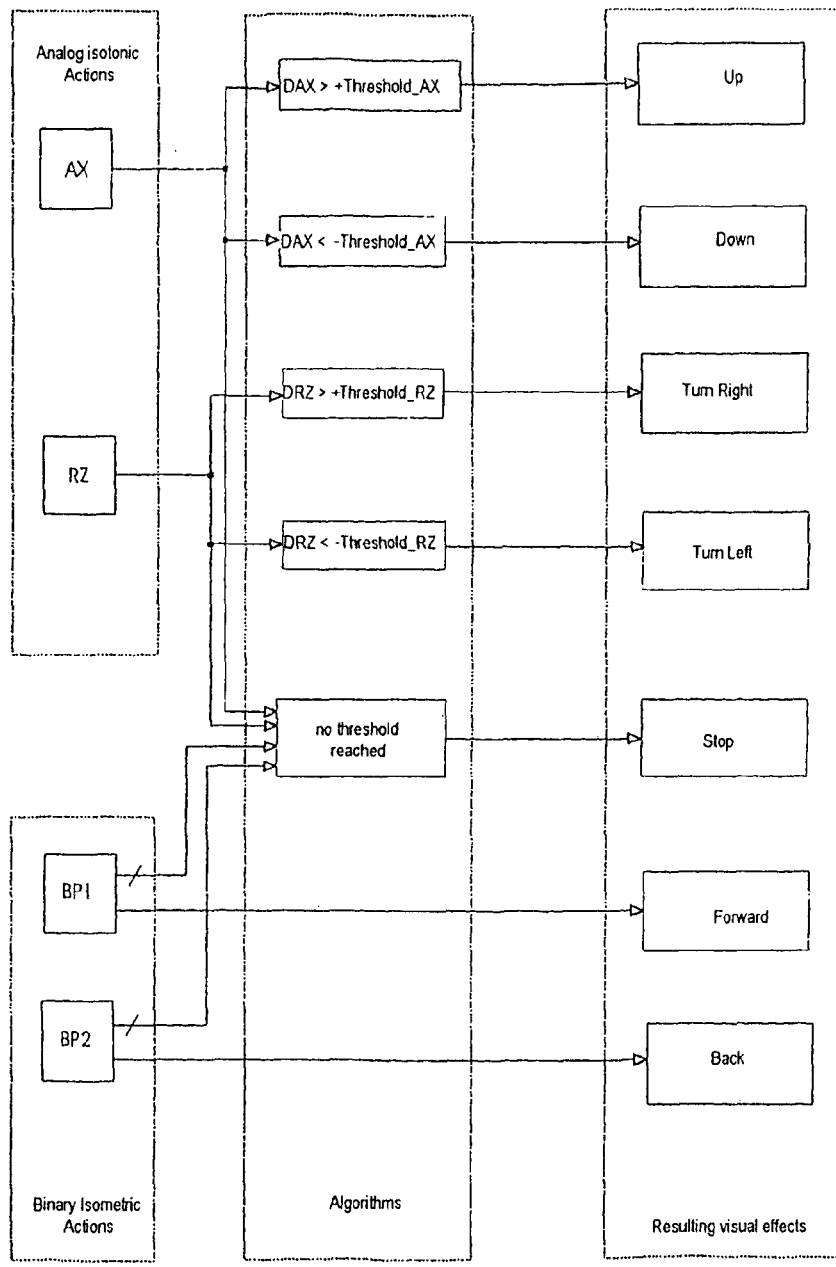
FIGS. 6 to 15 illustrate different processing algorithms used by the processing means of the navigation system from FIG. 5, according to different embodiments of the invention, for the exploration of a virtual space.

In this embodiment, as shown well in FIG. 6, the isotonic actions effected on the navigation device 10 generate in particular the input values AX and RZ used to rise, descend, turn to the right or turn to the left.

In this embodiment, the isometric actions are effected through the intermediary of two push-buttons BP1 and BP2 whose actuation generates a control signal for moving forward or back in the virtual space.

The control signal associated with the push-buttons BP1 and BP2 generates a forward or backward movement in the horizontal plane of the virtual space. If neither of the pushbuttons BP1 or BP2 is operated by the user, there is no movement in the virtual space.

The change of altitude is effected by modifying the inclination of the stand-alone navigation device 10 about the axis X, thereby modifying the value AX. The difference DAX is compared with a preset threshold ThresholdAX.

Thus the change of altitude is effected by inclining the front of the navigation device 10 up to rise and down to descend. If the second push-button BP2 is operated and a backward movement is therefore effected, the direction of movement on the altitude axis is reversed for reasons of ergonomics and of human logic.

To facilitate visualization in this embodiment, the vertical inclination axis of the camera is fixed at fifteen degrees to the ground and its inclination is fixed at zero degrees to enhance visual comfort when navigating in the virtual space.

Moreover, left and right turns in the virtual space are commanded as a function of the azimuth, i.e. of the rotation RZ about the axis Z. Thus turns are effected by turning the navigation device 10 in a horizontal plane like a compass. If this device leaves a so-called rest area, i.e. the absolute value of the rotation angle RZ exceeds a predetermined threshold value ThresholdRz, a signal commanding rotation to the left or to the right in the virtual space is applied until the navigation device 10 reverts to its rest position.

The speed of forward or backward movement in the horizontal plane depends on the parameters determined beforehand, such as FLTSPD.

There is given hereinafter by way of example an algorithm for processing input signals delivered by the navigation device to generate control output signals for navigating in the virtual space.

```
        if not BP2          //if not back
        then
            if ((DAX > +ThresholdAx) or (DAX < -ThresholdAx))
//threshold exceeded
            then
                POSZ=POSZ- KZ*( DAX - ThresholdAx)/CoefAx
//proportional up/down
            if BP2            //if back
            then
                if ((DAX > +ThresholdAx) or (DAX - ThresholdAx))
//threshold exceeded
                then
                    POSZ=POSZ+ KZ*( DAX < -ThresholdAx)/CoefAx
//reversed proportional            up/down
                if first pass
                then
                    StartAzimuth = Azimuth
                    ROTY=0      //twist (ry) reset to 0 for visual comfort
                else
                then
                    if (((StartAzimuth+DeltaZ)<ResultAngleMax) and
((StartAzimuth-DeltaZ) <ResultAngleMax))//not in critical angular zone
far from 0
                    then
                        //determination of rotation direction
                        if ((ROTZ<StartAzimuth+DeltaZ) and (ROTZ>
StartAzimuth-DeltaZ)       and RotationDirection !=0)
                            then RotationDirection=0         //neutral rotation
                        if ((ROTZ>StartAzimuth+DeltaZ) and (StartAzimuth+DeltaZ
<ResultAngleMax) and RotationDirection==0)
                            then RotationDirection=1         //positive rotation
                            direction
                        if ((ROTZ<StartAzimuth-DeltaZ) and (StartAzimuth-DeltaZ
>ResultAngleMin) and RotationDirection==0)
                            then RotationDirection=-1        //negative rotation
                            direction
                        if (ROTZ>StartAzimuth and ROTZ<ResultAngleMax and
RotationDirection=+1)
                            then ROTZ=ROTZ-(ROTZ-StartAzimuth)/AzimuthStep
                        if (ROTZ<StartAzimuth and ROTZ>ResultAngleMin and
RotationDirection==-1)
                            then ROTZ=ROTZ+(StartAzimuth-ROTZ)/AzimuthStep
                        if (ROTZ<StartAzimuth and RotationDirection==+1)
                            then ROTZ=ROTZ-(ROTZ+ResultAngleMax-
StartAzimuth)/AzimuthStep
                        if (ROTZ>StartAzimuth and RotationDirection==-1)
                            then ROTZ=ROTZ+(StartAzimuth+ResultAngleMax-
ROTZ)/AzimuthStep
                    else     //critical angular zone as close to 0 degrees
                        StartAzimuth=0
                        if (((ROTZ<DeltaZ) or (ROTZ>ResultAngleMax-DeltaZ))
and RotationDirection!=0)
                            then RotationDirection = 0         //neutral rotation
                        if (((ROTZ<DeltaZ) or (ROTZ<ResultAngleMax/2) and
RotationDirection==0)
                            then RotationDirection = 1         //positive rotation
                            direction
                        if (((ROTZ<ResultAngleMax-DeltaZ) and
(ROTZ>ResultAngleMax/2) and RotationDirection= = 0)
                            then RotationDirection = -1 //negative rotation direction
                        if (ROTZ>StartAzimuth and ROTZ<ResultAngleMax and
RotationDirection==+1)
                            then ROTZ=ROTZ-(ROTZ-StartAzimuth)/AzimuthStep
                        if (ROTZ<StartAzimuth and ROTZ>ResultAngleMin and
RotationDirection==-1)
                            then ROTZ=ROTZ+(StartAzimuth-ROTZ)/AzimuthStep
                        if (ROTZ<StartAzimuth and RotationDirection==+1)
                            then ROTZ=ROTZ-(ROTZ+ResultAngleMax-
StartAzimuth)/AzimuthStep
                        if (ROTZ>StartAzimuth and RotationDirection==-1)
                            then ROTZ=ROTZ+(StartAzimuth+ResultAngleMax-
ROTZ)/AzimuthStep
            if BP1 //forward
            then
                POSY = POSY + ( KV * VITVOL * cos(ROTZ) )
                POSX = POSX - ( KV * VITVOL * sin(ROTZ) )
            if BP2         //back
            then
                POSY = POSY - ( KV * VITVOL * cos(ROTZ) )
                POSX = POSX + ( KV * VITVOL * sin(ROTZ) )
```

Figure 7:
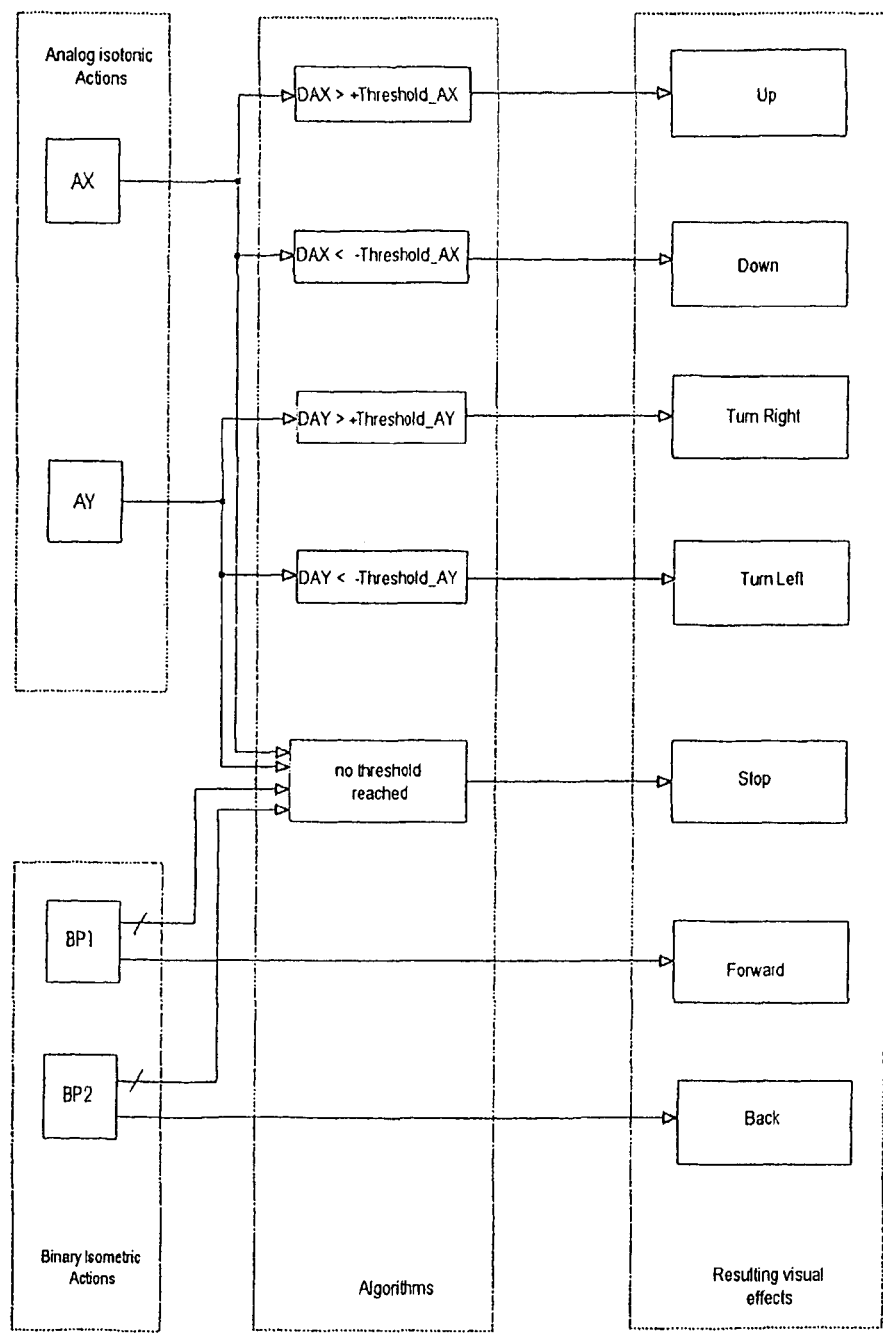

This embodiment may be slightly modified as shown in FIG. 7.

It is then a question of simulating a movement of the bird flight type with the same possibilities of movement in a virtual space.

In contrast to the embodiment described hereinabove in which turns to the right and to the left in the horizontal plane are effected by turning the navigation device 10 in a horizontal plane, here turns are effected by tilting the stand-alone device 10 laterally, i.e. by modifying its inclination with respect to the axis Y.

Thus there is considered as input data at the level of the isotonic actions the value AY given by the accelerometer associated with the axis Y. If the absolute value of the difference DAY exceeds a reference ThresholdAy, a rotation to the right or to the left is applied to the camera, until the navigation device 10 returns to its rest position, close to the starting reference position.

An example of the algorithm used by the processing means is given hereinafter:

```
        if not BP2          //if not back
        then
            if ((DAX > +ThresholdAx) or (DAX < -ThresholdAx))
```

-continued

```
//threshold exceeded
        then
            POSZ=POSZ– KZ*( DAX–ThresholdAx)/CoefAx
    //proportional up/down
        if BP2           //if back
        then
            if ((DAX > +ThresholdAx) or (DAX < –ThresholdAx))
//threshold exceeded
        then
            POSZ=POSZ+ KZ*( DAX–ThresholdAx)/CoefAx
//reversed proportional up/down
        if BP1 //forward
        then
            POSY = POSY + ( KV * VITVOL * cos(ROTZ) )
            POSX = POSX – ( KV * VITVOL * sin(ROTZ) )
        if BP2 //back
        then
            POSY = POSY – ( KV * VITVOL * cos(ROTZ) )
            POSX = POSX + ( KV * VITVOL * sin(ROTZ) )
            if (DAY > +ThresholdAy ) ROTZ=ROTZ+ (DAY–
ThresholdAY)/CoefAy //right turn
            if (DAY < –ThresholdAy ) ROTZ=ROTZ+
(DAY+ThresholdAY)/CoefAy //left turn
```

Combining the two embodiments described hereinabove may be envisaged.

To enhance visual comfort, the vertical rotation and the inclination of the camera are fixed.

The rotation may be effected by simultaneously tilting the navigation device laterally, specifically by modifying its rotation angle with respect to the axis Y, and turning the navigation device laterally in its plane, specifically by modifying its angle of rotation with respect to the axis Z.

An example of this processing algorithm used in this embodiment is given hereinafter:

```
        if not BP2            //if not back
        then
            if ((DAX > +ThresholdAx ) or (DAX < –ThresholdAx ))
//threshold exceeded
        then
            POSZ=POSZ– (DAX/CoefAx)      //proportional up/down
        if BP2       //if back
        then
            if ((DAX > +ThresholdAx ) or (DAX < –ThresholdAx ))
//threshold exceeded
        then
            POSZ=POSZ+ (DAX/CoefAx)      //reversed proportional
                                          up/down
        if (DAY > +ThresholdAy ) ROTZ=ROTZ+ (DAY/CoefAy)
//right power turn
        if (DAY < –ThresholdAy ) ROTZ=ROTZ+ (DAY/CoefAy)
//left power turn
        if first pass
        then
            StartAzimuth = Azimuth
        else
        then
            ROTY=0        //twist (ry) reset to 0 for visual comfort
        if ( Azimuth < (StartAzimuth – DeltaZ) )
        then              //right compass turn
            ROTZ = ROTZ + (StartAzimuth – Azimuth) / AzimuthStep
        if ( Azimuth > (StartAzimuth + DeltaZ) )
        then //left compass turn
            ROTZ = ROTZ – (Azimuth – StartAzimuth) / AzimuthStep
        if BP1 //forward
        then
            POSY = POSY + ( KV * VITVOL * cos(ROTZ) )
            POSX = POSX – ( KV * VITVOL * sin(ROTZ) )
        if BP2 //back
        then
            POSY = POSY – ( KV * VITVOL * cos(ROTZ) )
            POSX = POSX + ( KV * VITVOL * sin(ROTZ) )
```

Figure 8:
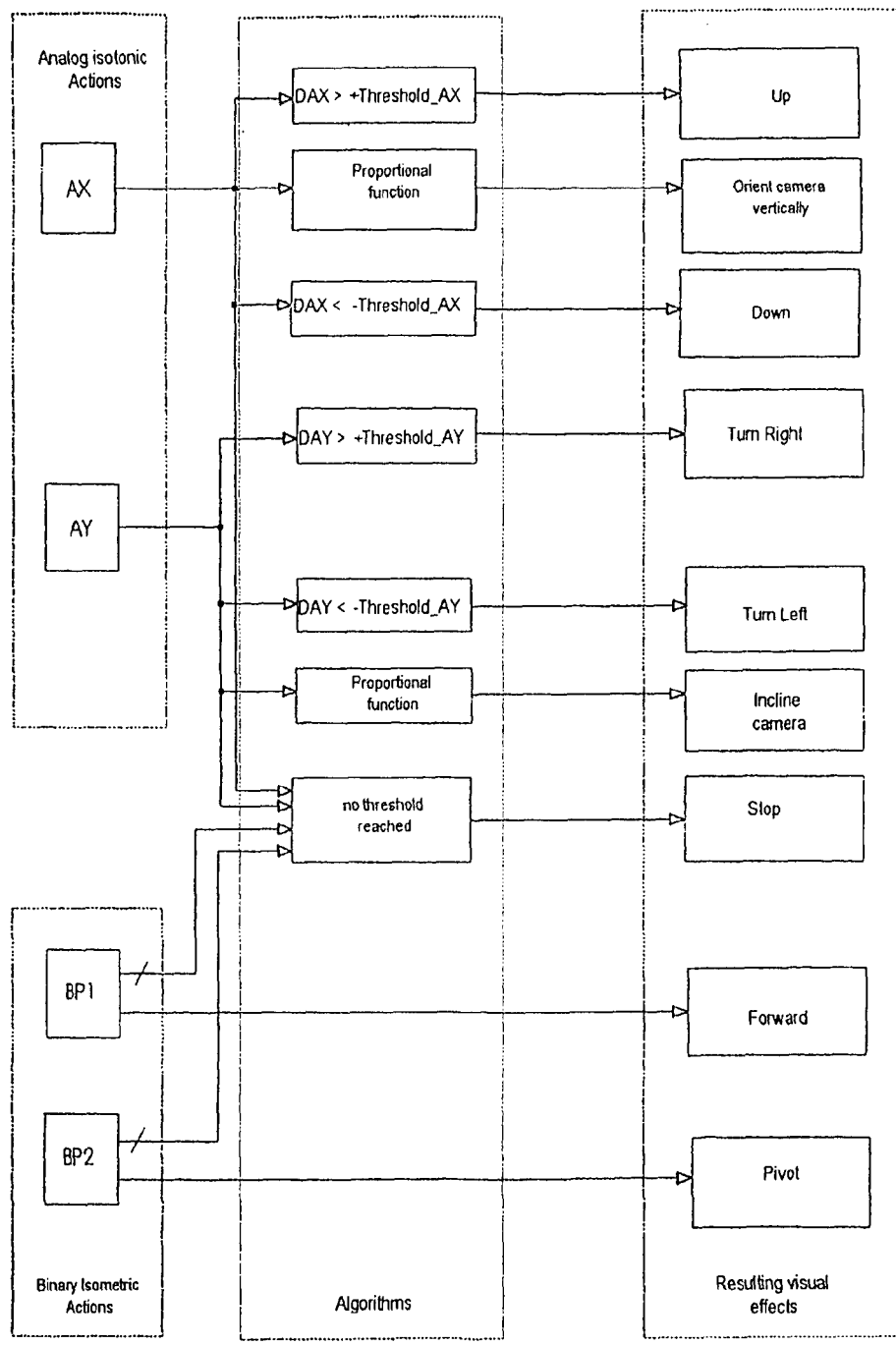

This type of consultation can be further improved in the manner shown in FIG. 8 in order to simulate an aircraft flight.

This consultation mode has the particular feature of modifying the orientation of the camera during flight, in contrast to the two embodiments described hereinabove in which the orientation of the camera is fixed in order to improve the visual comfort of the user.

A contrario, in this embodiment, it is required to give preference to the realism of the navigation in the virtual space.

Moreover, being a question of simulating the flight of an aircraft, backward movement of the camera is not desirable. This action must be replaced by an immediate half-turn of the camera on itself immediately one of the push-buttons, here BP2, is operated by the user.

For improved visual comfort, the angle of inclination of the camera is not modified by coupling it directly to the angle of inclination of the navigation device about the axis X, but in a ratio of 1/2, for example.

On the other hand, with regard to the inclination of the camera relative to the axis Y, it is preferable to maintain this angle fixed in order to promote the visual comfort of the user.

Finally, in this embodiment, turns to the right and to the left are effected as previously by inclining the navigation device 10 to the right or to the left with respect to the axis Y, the speed of rotation about the axis Z of the virtual space further depending on the amplitude of this inclination with respect to the axis Y of the navigation device 10.

An example of an algorithm used by the processing means to control this type of movement in a virtual space is given hereinafter.

```
        if BP1 //forward
        then
            POSY = POSY + ( KV * VITVOL * cos(ROTZ) )
            POSX = POSX – ( KV * VITVOL * sin(ROTZ) )
            if PIVOT then ROTZ=ROTZ–180
            NO PIVOT
        if BP2 //immediate reverse
        then
            POSY = POSY + ( KV * VITVOL * cos(ROTZ) )
            POSX = POSX – ( KV * VITVOL * sin(ROTZ) )
            if NOT PIVOT then ROTZ=ROTZ+180
            PIVOT
            if ((DAX > +ThresholdAx ) or (DAX < –ThresholdAx ))//up/down
        then
            POSZ=POSZ– (DAX/CoefAx)
            ROTX=elevation/2 + DeltaX       //camera inclination
            ROTY=DeltaY         //fixed camera inclination
            if (DAY > +ThresholdAy ) ROTZ=ROTZ+ (DAY/CoefAy)
//right turn
            if (DAY < –ThresholdAy ) ROTZ=ROTZ+ (DAY/CoefAy) //left
turn
```

In the three embodiments described hereinabove, the navigation device includes isometric devices in the form of two push-buttons BP1, BP2.

As indicated hereinabove, other types of isometric device may be used, and in particular a potentiometer PT, or a nail type force sensor.

Figure 9:
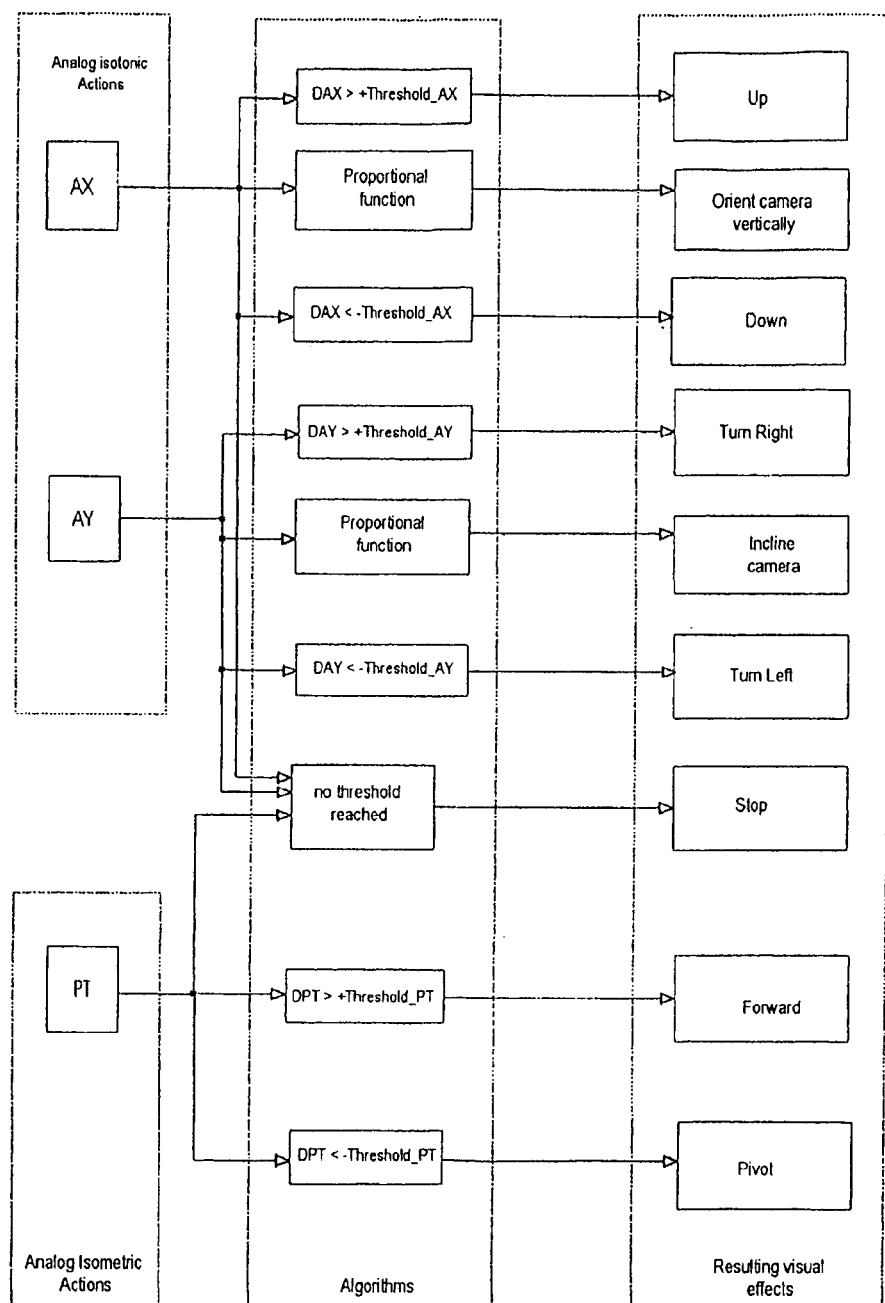

In such a case, and as shown in FIG. 9, for the embodiment described hereinabove with reference to FIG. 8, the action on the isometric device is no longer a binary action of the all or nothing type but an analog action.

Accordingly, the signal generated by a potentiometer is analyzed in the same manner as the signals supplied by the isotonic devices. In particular, the difference of the value measured at the output of the potentiometer from a reference value fixed on the initialization of the system is compared to a predetermined threshold value ThresholdPT with the result that as a function of the result of this comparison a forward or back (or half-turn) action is executed in the virtual navigation space.

Figure 10:
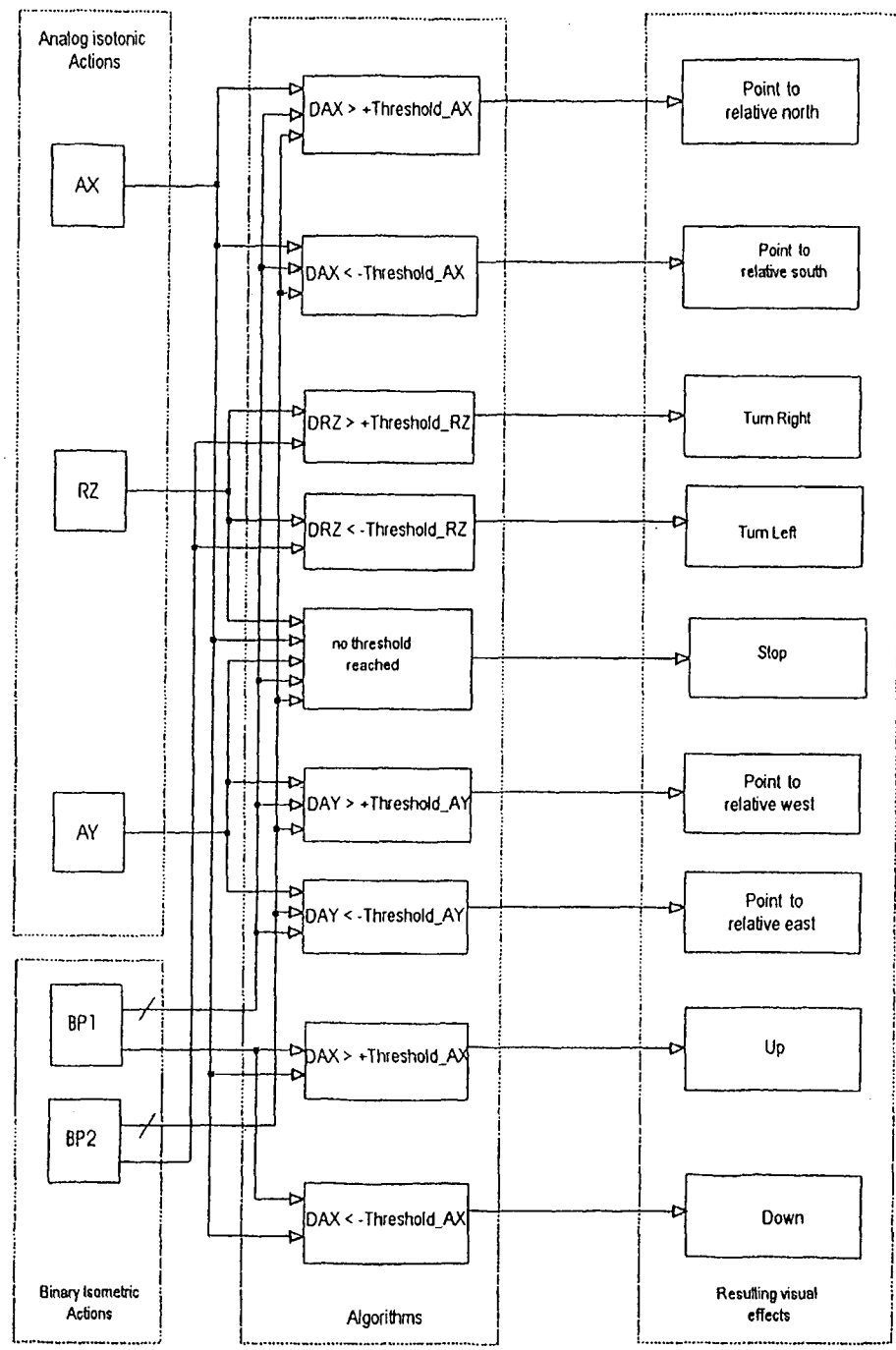

There will be described now with reference to FIG. 10 another embodiment in which the navigation in the virtual space simulates the overflight of a satellite.

This type of consultation must give the possibility of stopping, moving toward the four points of the compass relative to the display screen of the virtual space, turning, rising or descending.

In this embodiment, the movement on the display screen has parameters set so that relative north corresponds to the top of the screen, for example, relative south corresponding to the bottom of the screen and relative west and east respectively corresponding to the left-hand side and to the right-hand side of the screen.

Movement toward relative north is effected by inclining downward the front of the navigation device 10, for example, movement toward relative south being effected by inclining downward the rear of the navigation device 10. Movement toward relative west is effected by inclining the navigation device 10 toward the left and movement toward relative east is effected by inclining the navigation device 10 toward the right.

Accordingly, as a function of the inclination about the horizontal axes X and Y of the navigation device 10, movement toward the four points of the compass can be obtained. To calculate the speed of movement, the multiplier coefficient KV defined hereinabove is used, the value whereof may be fixed in this embodiment at KV=POSZ/2000, thus depending on the position in altitude.

As this is a question of a consultation mode of the satellite overflight type, the latter is considered as looking toward the ground. The camera is therefore turned toward the ground so that the value ROTX=−90°.

As before, the rotation toward the right or toward the left may be obtained from the value of the rotation RZ about the axis Z of the navigation device 10.

Moreover, pressing one of the two push-buttons with which the navigation device 10 is equipped, here the push-button BP1, modifies the vertical position of the camera as a function of the vertical inclination of the navigation device 10. In practice, if the front of the navigation device 10 is inclined downward a descent in altitude is effected and if the front of the navigation device 10 is inclined upward a rise in altitude is effected.

The actions for turning to the right or to the left are effected only with simultaneous pressing of the push-button BP2.

The comfort of the user can therefore be optimized by decorrelating the various possible movements.

In particular, in this type of navigation, two phases can be distinguished, the search phase and the consultation phase.

In the search phase, a movement toward the four points of the compass is primarily used. In the consultation phase, on the other hand, rotation toward the left and rotation toward the right are used.

Pressing the push-button BP1 locks the movement according to the points of the compass so that the user can position the displayed map exactly as he requires.

For the vertical movement, and thus the choice of the consultation height, the user may in each of the phases need to modify his point of view to optimize visual comfort: it is therefore preferable to block rotation toward the left and toward the right and horizontal movements by means of the push-button BP2.

There is indicated hereinafter by way of example an algorithm used by the processor means to calculate from the input values the output control signals for navigation in the virtual space.

```
ROTX=−90 ; //camera toward ground
if not BP1 and not BP2
then
   if ( DAX > +ThresholdAx ) //proportional north
   then
      POSY = POSY + KZ* ((DAX−ThresholdAx)/CoefAx) *cos(ROTZ)
      POSX = POSX − KZ* ((DAX−ThresholdAx)/CoefAx) *sin(ROTZ)
   if ( DAX < −ThresholdAx ) //proportional south
   then
      POSY = POSY + KZ* ((DAX+ThresholdAx)/CoefAx) *cos(ROTZ)
      POSX = POSX − KZ* ((DAX+ThresholdAx)/CoefAx) *sin(ROTZ)
   if ( DAY > +ThresholdAy ) //proportional west
   then
      POSY = POSY + KZ* ((DAY−ThresholdAy)/CoefAx) *cos(ROTZ + 90)
      POSX = POSX − KZ* ((DAY−ThresholdAy)/CoefAx) *sin(ROTZ +90)
   if ( DAY < −ThresholdAy ) //proportional east
   then
      POSY = POSY − KZ* ((DAY+ThresholdAy)/CoefAx) *cos(ROTZ− 90)
      POSX = POSX + KZ* ((DAY−ThresholdAy)/CoefAx) *sin(ROTZ − 90)
if BP1
then
   if ( DAX > +ThresholdAx )
   then POSZ = POSZ − KZ * ((DAX−ThresholdAx)/CoefAx)
   //proportional altitude adjustment
if BP2
then
   if first pass
   then
```

```
            StartAzimuth = Azimuth
            else
                if (((StartAzimuth+DeltaZ)<ResultAngleMax) and ((StartAzimuth–
DeltaZ) >ResultAngleMin)) //not in critical angular zone as far from 0
                    then    //determination of rotation direction
                    if ((ROTZ<StartAzimuth+DeltaZ) and (ROTZ> StartAzimuth–
DeltaZ) and RotationDirection !=0)
                        then RotationDirection=0        //neutral rotation
                    if ((ROTZ>StartAzimuth+DeltaZ) and (StartAzimuth+DeltaZ
<ResultAngleMax) and RotationDirection==0)
                        then RotationDirection=1        //positive rotation direction
                    if ((ROTZ<StartAzimuth–DeltaZ) and (StartAzimuth–DeltaZ
>ResultAngleMin) and RotationDirection==0)
                        then RotationDirection=–1       //negative rotation direction
                    if (ROTZ>StartAzimuth and ROTZ<ResultAngleMax and
RotationDirection=+1)
                        then ROTZ=ROTZ–(ROTZ–StartAzimuth)/AzimuthStep
                    if (ROTZ<StartAzimuth and ROTZ>ResultAngleMin and
RotationDirection==–1)
                        then ROTZ=ROTZ+(StartAzimuth–ROTZ)/AzimuthStep
                    if (ROTZ<StartAzimuth and RotationDirection==+1)
                        then ROTZ=ROTZ–(ROTZ+ResultAngleMax–
StartAzimuth)/AzimuthStep
                    if (ROTZ>StartAzimuth and RotationDirection==–1)
                        then ROTZ=ROTZ+(StartAzimuth+ResultAngleMax–
ROTZ)/AzimuthStep
                else            //critical angular zone as close to 0 degrees
                    StartAzimuth=0
                    if (((ROTZ<DeltaZ) or (ROTZ>ResultAngleMax–DeltaZ)) and
RotationDirection!=0)
                        then RotationDirection = 0      //neutral rotation
                    if ((ROTZ>DeltaZ) or (ROTZ<ResultAngleMax/2) and
RotationDirection==0)
                        then RotationDirection = 1      //positive rotation direction
                    if ((ROTZ<ResultAngleMax–DeltaZ) and
(ROTZ>ResultAngleMax/2) and RotationDirection==0
                        then RotationDirection = –1 //negative rotation direction
                    if (ROTZ>StartAzimuth and ROTZ<ResultAngleMax and
RotationDirection==+1)
                        then ROTZ=ROTZ–(ROTZ–StartAzimuth)/AzimuthStep
                    if (ROTZ<StartAzimuth and ROTZ>ResultAngleMin and
RotationDirection==–1)
                        then ROTZ=ROTZ+(StartAzimuth–ROTZ)/AzimuthStep
                    if (ROTZ<StartAzimuth and RotationDirection==+1)
                        then ROTZ=ROTZ–(ROTZ+ResultAngleMax–
StartAzimuth)/AzimuthStep
                    if (ROTZ>StartAzimuth and RotationDirection==–1)
                        then ROTZ=ROTZ+(StartAzimuth+ResultAngleMax–
ROTZ)/AzimuthStep
```

Figure 11:
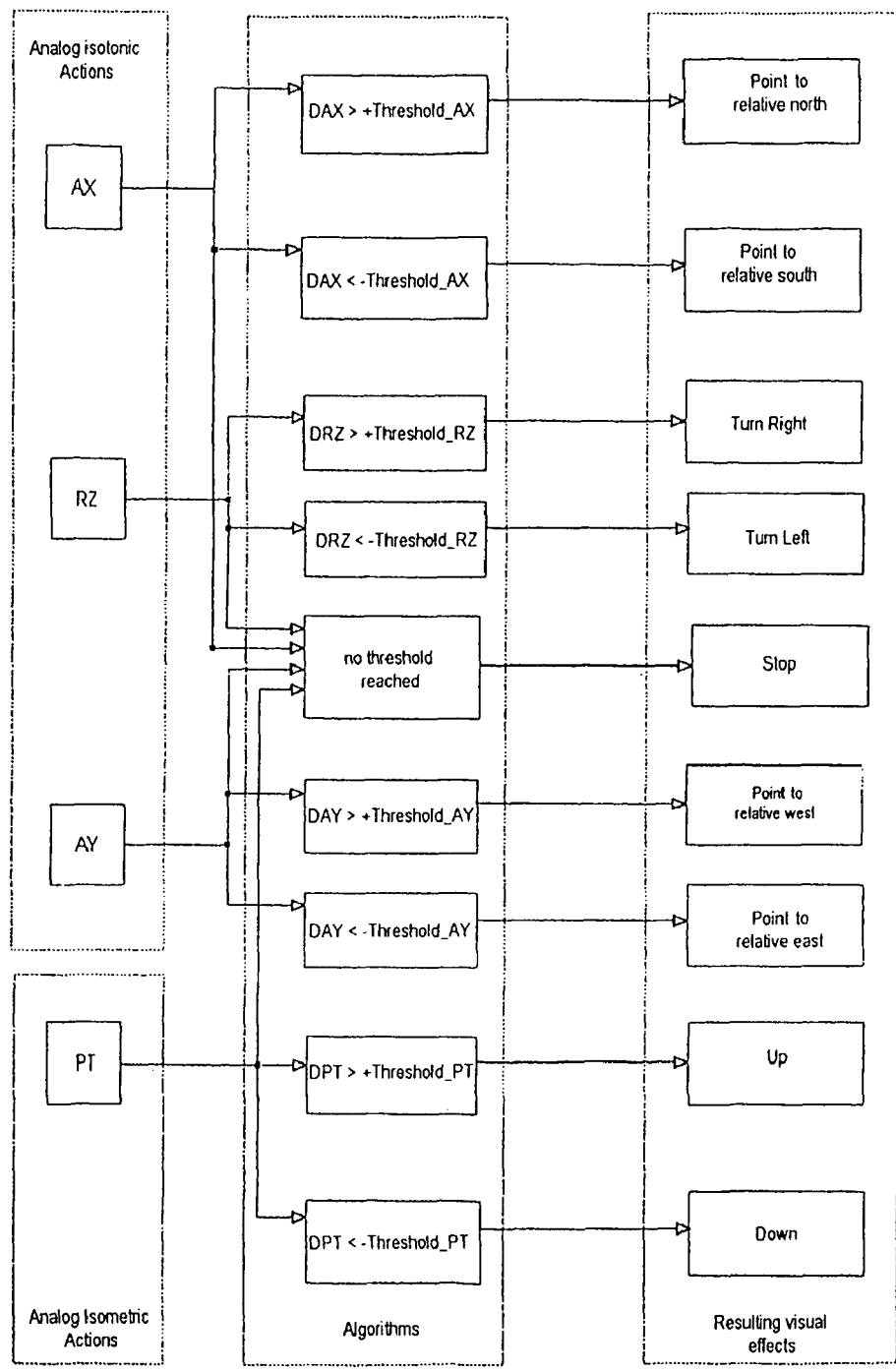

For the same application, there is shown in FIG. 11 the processing algorithm used if the push-buttons BP1 and BP2 are replaced by an isometric device sensitive to a force such as a potentiometer or a nail type force sensor.

In such a case, the actions for rising or descending in altitude may be controlled only by means of the value measured at the output of the potentiometer and the comparison of the difference between this value and a reference value with a predetermined threshold value ThresholdPT. The same applies if the potentiometer is replaced by a nail type sensor, starting for example from the value CLX measured on a deformation axis X of the nail.

Figure 12:
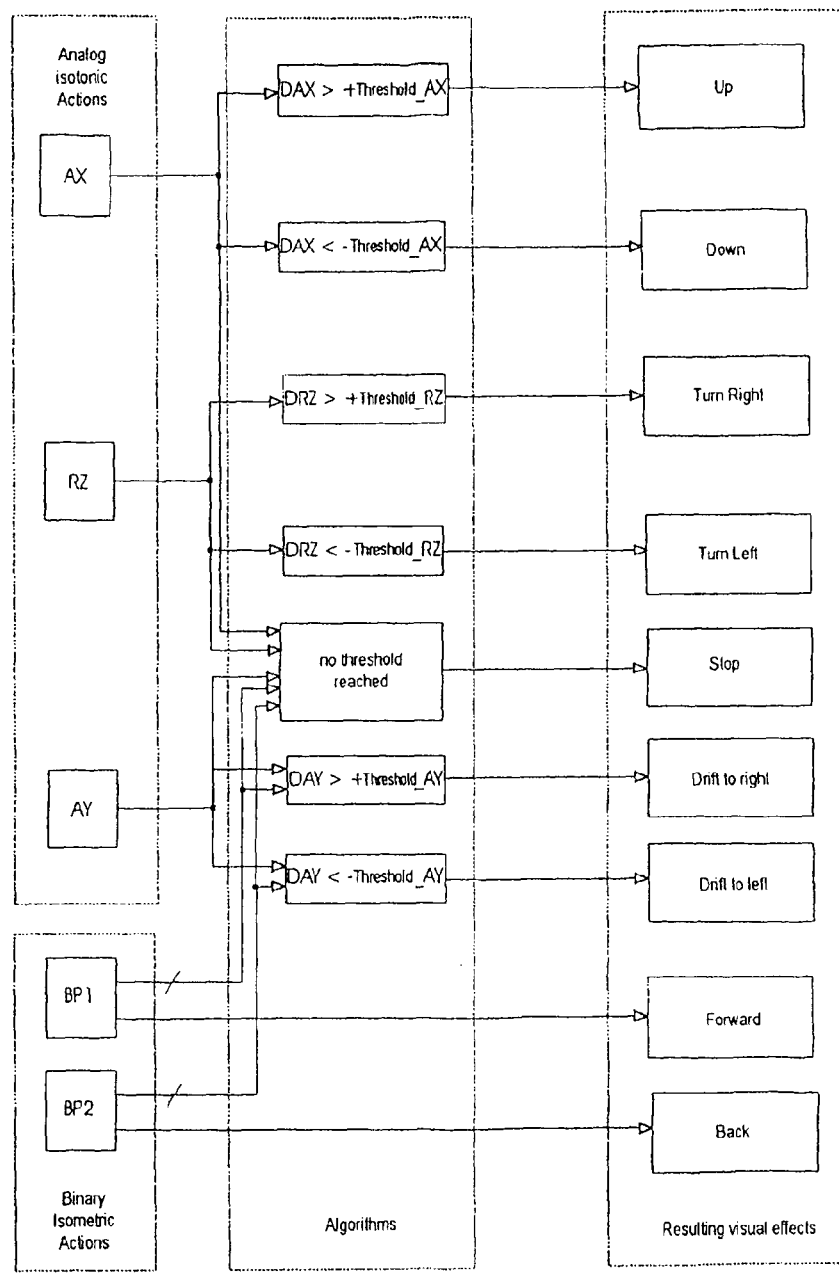

There will now be described with reference to FIG. 12 another embodiment of the invention in which movement in the virtual space is of the helicopter type.

In this type of movement, it is also necessary to have the possibility of stopping, moving forward or back, moving up or down, turning in place and turning in motion. It is also necessary to have the possibility of being able to turn about a particular point.

For lateral movements in the horizontal plane XY of the virtual space, the speed of movement is dependent on the altitude and in this regard the multiplier coefficient KV is used the value whereof may be equal to KV=POSZ/1000.

As already described hereinabove, the actions of rising and descending may be obtained by moving the navigation device 10 relative to its axis X, the actions of turning to the right or turning to the left may be obtained in response to a movement in rotation about the axis Z of the navigation device 10, and the actions of drifting to the right or drifting to the left may be obtained by inclining the device relative to the horizontal axis Y.

By combining the rotation of the navigation device about the axis Z and its inclination with respect to the axis Y, it is possible to obtain a rotation to the right and a drift to the left or a rotation to the left and a drift to the right enabling rotation about a point to be effected while keeping that point on a cross-hair line in the virtual space.

As in the embodiments described hereinabove for simulating bird flight, the actions on the isometric devices of push-button type BP1 or BP2, where applicable replaced by a force sensor of the potentiometer type or a force sensor of the nail type, generate actions of moving forward or back in the virtual space.

An example of an algorithm used by the processing means in this embodiment is given hereinafter:

```
            if not BP2          // if not back
            then
                if (( DAX > +ThresholdAx ) or
( DAX < -ThresholdAx ))//threshold exceeded
                then
                    POSZ = POSZ - KZ *(DAX-ThresholdAx)/CoefAx ;
//proportional up/down
            if BP2          // if back
            then
                if (( DAX > +ThresholdAx ) or ( DAX < -ThresholdAx ))
//threshold exceeded
                then
                    POSZ = POSZ + KZ *(DAX-ThresholdAx)/CoefAx;
// reversed proportional up/down
                if first pass
                then
                    StartAzimuth = Azimuth
                    ROTY = 0 ;          // twist (ry) reset to 0 for visual
                    comfort
                else
                then
                    if (((StartAzimuth+DeltaZ)<ResultAngleMax) and
((StartAzimuth-DeltaZ) >ResultAngleMin)) //not in critical angular zone
as far from 0
                    then
                        //determination of rotation direction
                        if ((ROTZ<StartAzimuth+DeltaZ) and
(ROTZ> StartAzimuth-DeltaZ) and RotationDirection !=0)
                            then RotationDirection=0       //neutral rotation
                        if ((ROTZ>StartAzimuth+DeltaZ) and
(StartAzimuth+DeltaZ<ResultAngleMax) and RotationDirection==0)
                            then RotationDirection=1       //positive rotation
                            direction
                        if ((ROTZ<StartAzimuth-DeltaZ) and
(StartAzimuth-DeltaZ>ResultAngleMin) and RotationDirection==0)
                            then RotationDirection=-1      //negative rotation
                            direction
                        if (ROTZ>StartAzimuth and ROTZ<ResultAngleMax and
RotationDirection==+1)
                            then ROTZ=ROTZ-(ROTZ-StartAzimuth)/AzimuthStep
                        if (ROTZ<StartAzimuth and ROTZ>ResultAngleMin and
RotationDirection==-1)
                            then ROTZ=ROTZ+(StartAzimuth-ROTZ)/AzimuthStep
                        if (ROTZ<StartAzimuth and RotationDirection==+1)
                            then ROTZ=ROTZ-(ROTZ+ResultAngleMax-
StartAzimuth)/AzimuthStep
                        if (ROTZ>StartAzimuth and RotationDirection==-1)
                            then ROTZ=ROTZ+(StartAzimuth+ResultAngleMax-
ROTZ)/AzimuthStep
                else       //critical angular zone as close to 0
                degrees
                    StartAzimuth=0
                    if (((ROTZ<DeltaZ) or (ROTZ>ResultAngleMax-DeltaZ))
and RotationDirection!=0)
                        then RotationDirection = 0       //neutral rotation
                    if ((ROTZ>DeltaZ) and (ROTZ<ResultAngleMax/2) and
RotationDirection==0)
                        then RotationDirection = 1       //positive rotation
                        direction
                    if ((ROTZ<ResultAngleMax-DeltaZ) and
(ROTZ>ResultAngleMax/2) and RotationDirection==0
                        then RotationDirection = -1 //negative rotation direction
                    if (ROTZ>StartAzimuth and ROTZ<ResultAngleMax and
RotationDirection==+1)
                        then ROTZ=ROTZ-(ROTZ-StartAzimuth)/AzimuthStep
                    if (ROTZ<StartAzimuth and ROTZ>ResultAngleMin and
RotationDirection==-1)
                        then ROTZ=ROTZ+(StartAzimuth-ROTZ)/AzimuthStep
                    if (ROTZ<StartAzimuth and RotationDirection==+1)
                        then ROTZ=ROTZ-(ROTZ+ResultAngleMax-
StartAzimuth)/AzimuthStep
                    if (ROTZ>StartAzimuth and RotationDirection==-1)
                        then ROTZ=ROTZ+(StartAzimuth+ResultAngleMax-
ROTZ)/AzimuthStep
            if (DAY>+ThresholdAy)       //left lateral movement
            then
                POSY=POSY+KL*((DAY-ThresholdAy)/
                CoefAy)*cos(ROTZ+90)
                POSX=POSX-KL*((DAY-ThresholdAy)/
                CoefAy)*sin(ROTZ+90)
            if (DAY<-ThresholdAy)       //right lateral movement
            then
                POSY=POSY+KL*((ThresholdAy-DAY)/
                CoefAy)*cos(ROTZ-90)
                POSX=POSX-KL*((ThresholdAy-DAY)/
                CoefAy)*sin(ROTZ-90)
            if BP1 //forward
            then
                POSY = POSY + ( KV * VITVOL * cos(ROTZ) )
                POSX = POSX - ( KV * VITVOL * sin(ROTZ) )
            if BP2 //back
            then
                POSY =       POSY - ( KV * VITVOL * cos(ROTZ) )
                POSX =       POSX + ( KV * VITVOL * sin(ROTZ) )
```

Figure 13:
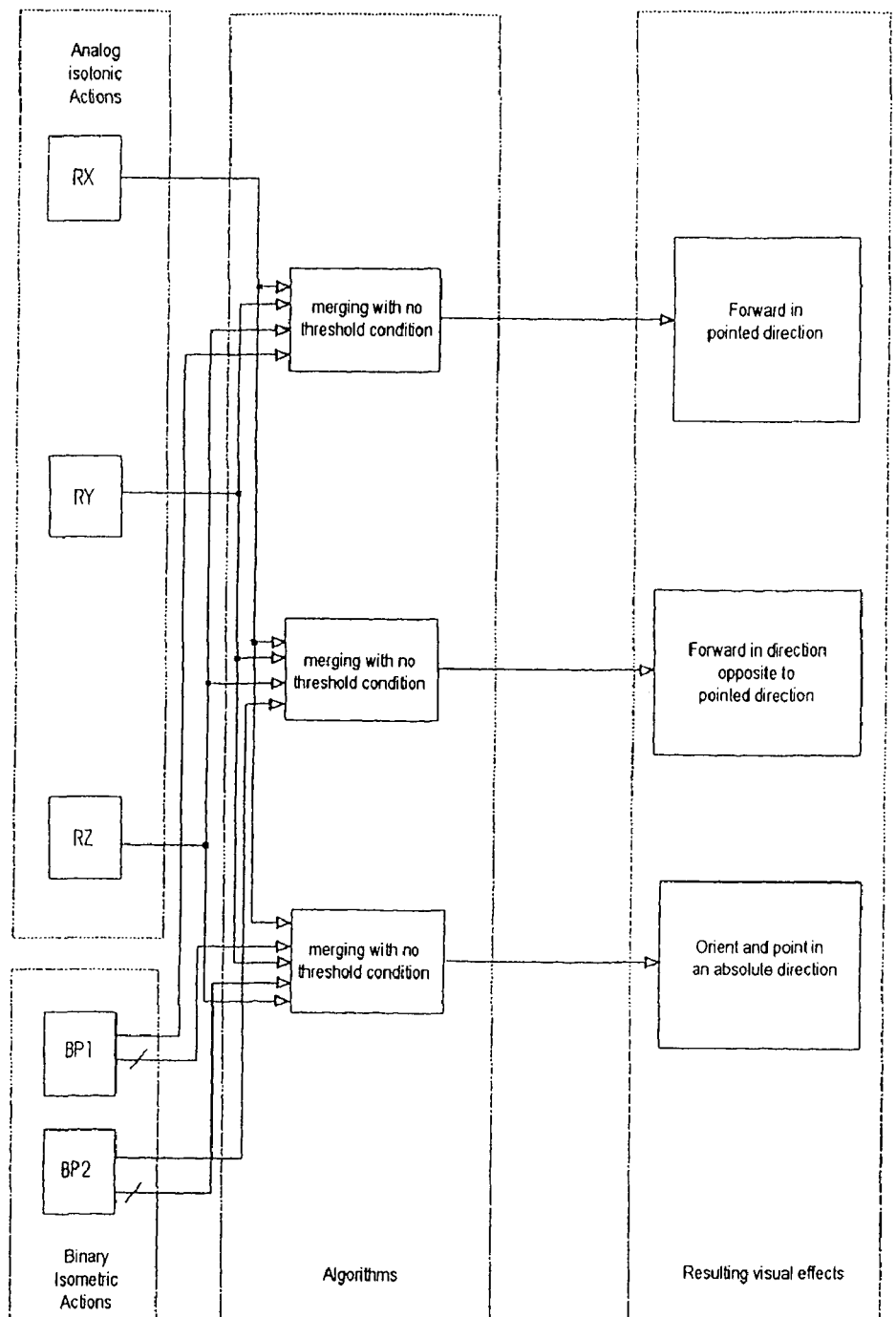

There will now be described with reference to FIG. 13 another embodiment of the invention in which navigation in the virtual space orients the camera in the same way as the stand-alone navigation device manipulated by the user. This orientation is absolute with respect to magnetic north, in order to be able to point to a precise point depending on the orientation of the navigation device when action is applied to one of the isometric devices of the navigation device. A type of navigation in the manner of a pointer is obtained in this way.

To make pointing more accurate, it is possible to provide cross-hairs for aiming in the application.

In this embodiment, the angle values calculated about the various axes X, Y, Z of the navigation device 10 corresponding to the rotation angles RX, RY and RZ are directly assigned to the angles of the camera in the virtual space.

Thus the angular coordinates ROTX, ROTY and ROTZ of the camera are equal to the elevation value RX, the twist value RY and the azimuth value RZ of the navigation device 10.

As a function of the operation of one or the other of the push-buttons BP1 or BP2, an action of movement in the pointed direction and a direction of movement in the direction opposite to the pointed direction are effected.

An example of a processing algorithm executed in this embodiment is given hereinafter:

```
ROTX = elevation
ROTY = -twist
ROTZ = -azimuth
if BP1 //forward in pointed direction
then
    POSY = POSY + KV * VITVOL * cos(ROTZ) * cos(ROTX)
    POSX = POSX - KV * VITVOL * sin(ROTZ) * cos(ROTX)
    POSZ = POSZ + KV * VITVOL * sin(ROTX)
if BP2 //back in direction opposite to pointed direction
then
    POSY = POSY - KV * VITVOL * cos(ROTZ) * cos(ROTX)
    POSX = POSX + KV * VITVOL * sin(ROTZ) * cos(ROTX)
    POSZ = POSZ - KV * VITVOL * sin(ROTX)
```

Figure 14:
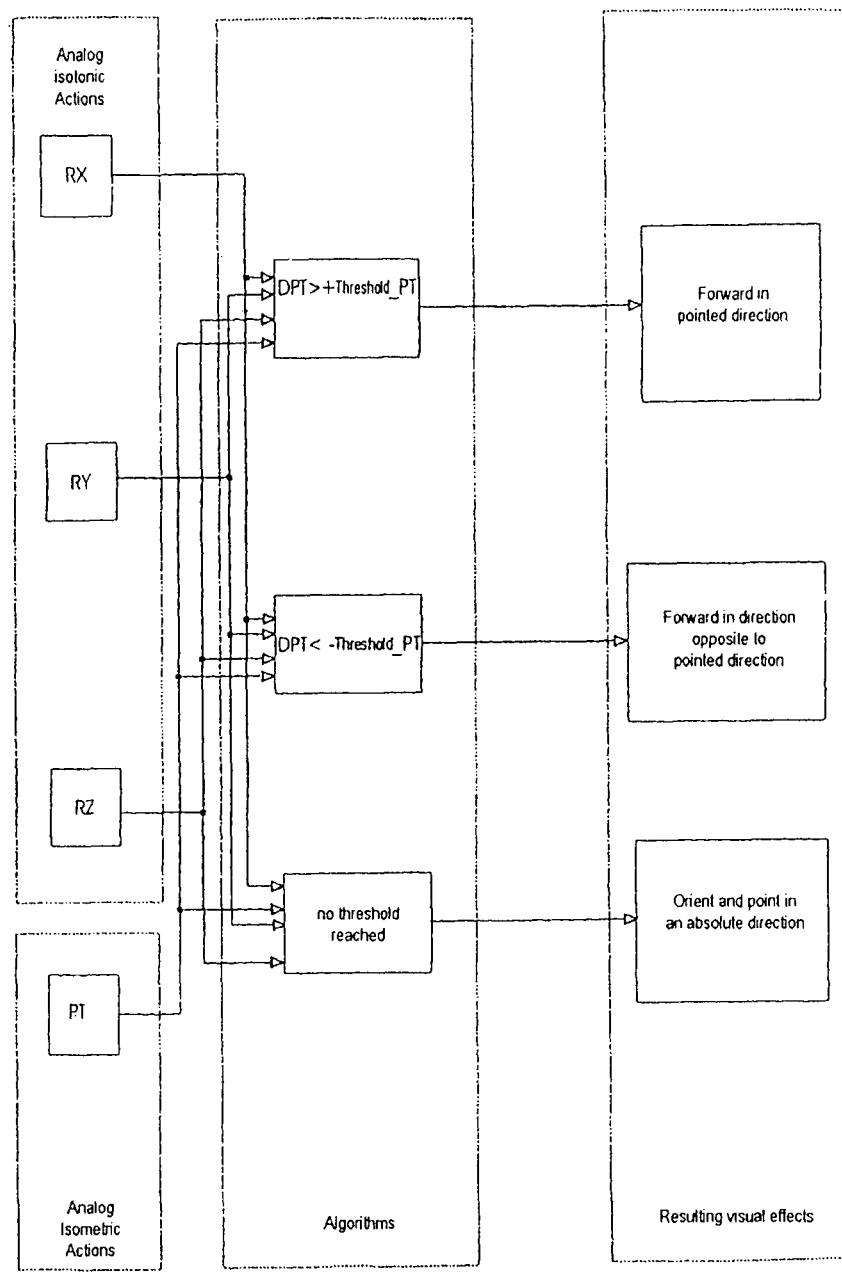

In the same type of application, FIG. 14 shows an algorithm used when the isometric device is sensitive to a force. In this example, the isometric device is a potentiometer. As explained hereinabove in the other embodiments, as a function of a predetermined threshold value ThresholdPT, action on the potentiometer has the effect of generating a movement in the pointed direction or a movement in the direction opposite to the pointed direction.

This compass type mode of movement may be the subject of a certain number of variants.

In particular, it is possible to regulate the speed of movement with the aid of a variable hereinafter denoted "gaz". The direction of the movement may also be given, not by the isometrics device of the push-button type BP1 and BP2, but directly with the value of the lateral inclination of the device, i.e. its rotation about the axis Y.

The algorithm used by the processing means then takes the following form:

```
ROTX = elevation      //absolute orientation
ROTZ = azimuth (-phi)     //absolute orientation
gaz = twist (-psi)     //accelerator coefficient
POSY=POSY+ KV*VITVOL*gaz*cos(ROTZ) * cos(ROTX)
POSX=POSX- KV*VITVOL*gaz*sin(ROTZ) * cos(ROTX)
POSZ=POSZ+ KV*VITVOL*gaz*sin(ROTX)
```

In another embodiment, navigation may be simplified so that the compass behaves as a compass with one dimension, enabling turning to the right or to the left if the navigation device is moved away from its rest position with respect to the axis Z. An action on the navigation device with respect to the axis X, by inclining it forward or backward, serves to rise or descend in altitude. There may also be forward or backward movement in proportion to the lateral inclination with respect to the axis Y of the navigation device 10.

In this type of embodiment, it is advantageous to fix the multiplier coefficient for the speed of lateral movement depending on the altitude at a value of the type POSZ/5000.

An algorithm example is given hereinafter to illustrate this particular embodiment:

```
             // accelerator proportional to inclination
             if (DAY > +ThresholdAy ) gaz = (DAY/CoefAx)
             if (DAY < -ThresholdAy ) gaz = (DAY/CoefAx) or = 0
alternatively
             if (DAY > -ThresholdAy && DAY < ThresholdAy ) accelerator=0 ;
             POSY=POSY+ ( KV*VITVOL*gaz*cos(ROTZ) ) //movement
             POSX=POSX- ( KV*VITVOL*gaz*sin(ROTZ) ) //movement
             if (( DAX > +ThresholdAx ) or ( DAX < -ThresholdAx ))       //
threshold exceeded
                   then
                   POSZ = POSZ - (DAX/CoefAx)       // proportional up/down
                   if first pass
                   then
                   StartAzimuth = Azimuth
                   else
                   then
                   ROTY = 0     //twist (ry) reset to 0 for visual comfort
                   if ( Azimuth < (StartAzimuth - DeltaZ ))
                   then    //right compass turn
                   ROTZ = ROTZ + (StartAzimuth - Azimuth) / AzimuthStep
                   if ( Azimuth > (StartAzimuth + DeltaZ ))
                   then    //left compass turn
                   ROTZ = ROTZ - (Azimuth - StartAzimuth) / AzimuthStep
```

It will be noted that in the methods described hereinabove the use of the raw values given by the accelerometers for the axis X (AX) or the axis Y (AY) may be replaced by the use of the output values of the magnetometers (MX or MY) or calculated angle values with respect to the axis X (RX) or with respect to the axis Y (RY).

It is of course necessary to use threshold values appropriate to each type of sensor and data used.

In a similar way to the embodiments described hereinabove, other types of application may be implemented in a virtual navigation space.

In particular, it may be a question of the movement of a character or a vehicle over a terrestrial surface or over the surface of water.

Unlike the foregoing embodiments, the altitude is not modified.

On the other hand, the character or object must be able in the virtual space to stop, go forward or back, turn in place, turn about an object, move laterally to the left or to the right, or modify the orientation of the gaze by raising or lowering the head.

All of the navigation methods described hereinabove may also be used in this type of application by modifying the assignment of the "up" and "down" actions that use the concept of altitude.

Instead, this type of action may be used to modify the vertical orientation of the camera, and in particular to modify the point of view of the user in order to simulate looking up or looking down.

Figure 15:
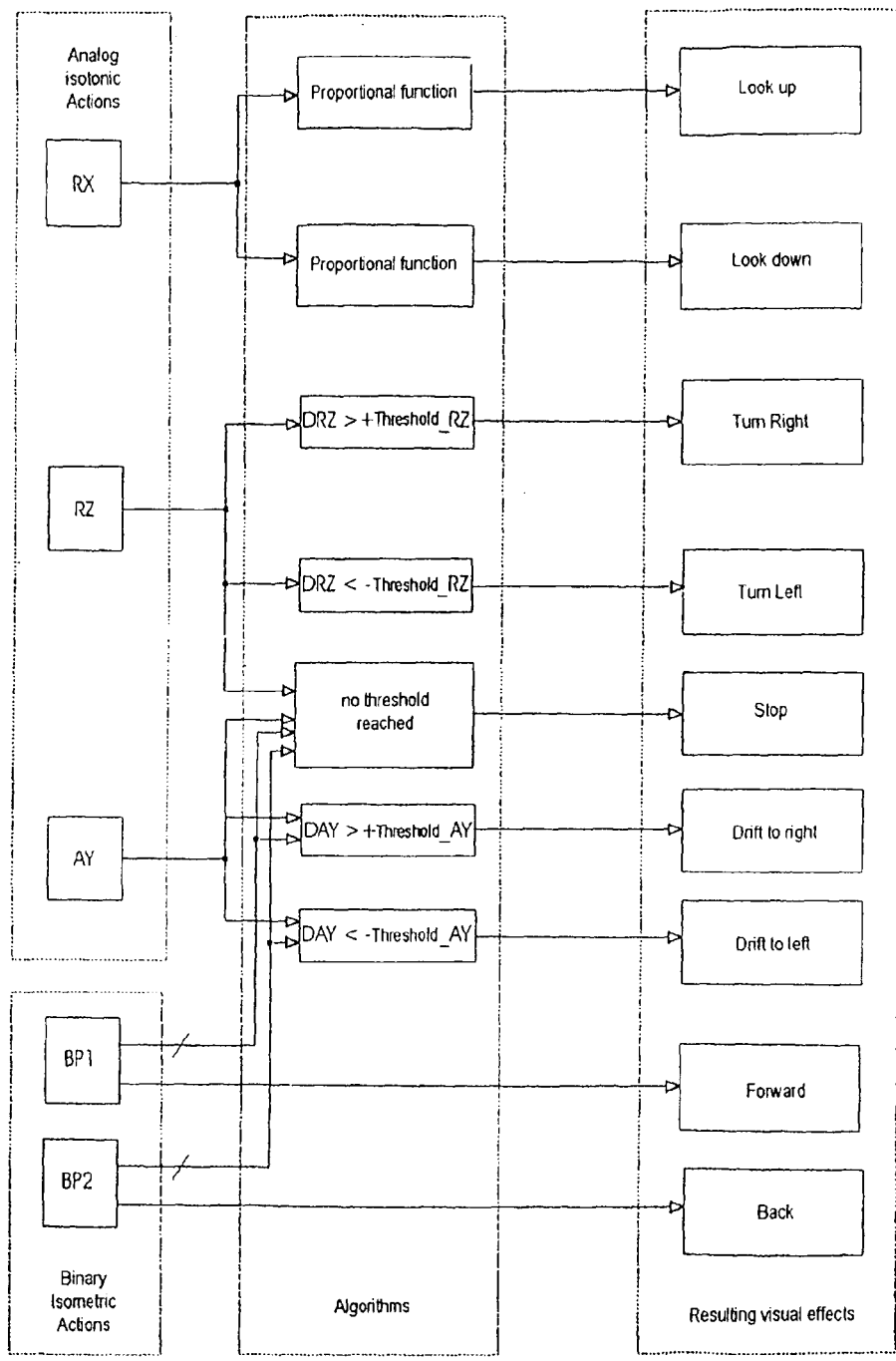

FIG. 15 is a diagram of one example of navigating a character in a virtual space of the movement in a building or town type.

The algorithm used by the processing means is similar to that used in the embodiments described hereinabove for simulating an aircraft or a helicopter, only the adjustment of the altitude being eliminated.

In particular, the value of the elevation RX with respect to the axis X of the navigation device 10 is directly and proportionately associated with the angular position ROTX for vertically orienting the camera so that the gaze of the character is directed up or down.

Rotating the navigation device about the axis Z generates actions for turning to the right or to the left and inclination of the navigation device about the axis Y also produces drifting movements of the character to the right or to the left.

As before, operating one or the other of the push-buttons BP1 respectively corresponds to the character moving forward or back in the virtual space.

An example of the algorithm used by the processing means in this type of navigation in a virtual space is given hereinafter:

```
             ROTX=elevation       //vertical orientation of camera
operates on character looking up/down
             if first time
             then
```

```
        StartAzimuth = Azimuth
        ROTY=0 ;       //twist at 0
        else
        if ( Azimuth < StartAzimuth − DeltaZ )
        then     //right rotation
        ROTZ = ROTZ + (StartAzimuth − Azimuth) / AzimuthStep
        if ( Azimuth > StartAzimuth + DeltaZ )
        then     //left rotation
        ROTZ = ROTZ − (Azimuth − StartAzimuth) / AzimuthStep
        If BP1 or BP2
        then
        if BP1
        then            //forward
        POSY = POSY +      ( KV * VITVOL * cos(ROTZ) )
        POSX = POSX −      ( KV * VITVOL * sin(ROTZ) )
        if BP2
        then            //back
        POSY = POSY − ( KV * VITVOL * cos(ROTZ) )
        POSX = POSX + ( KV * VITVOL * sin(ROTZ) )
        else
        if ( DAY > +ThresholdAy )
        then    // right lateral movement
        POSY = POSY + ( KL * VITVOL * cos( ROTZ + 90 ) )
        POSX = POSX − ( KL * VITVOL * sin( ROTZ + 90 ) )
        if ( DAY < −ThresholdAy )
        then    // left lateral movement
        POSY = POSY + ( KL * VITVOL * cos( ROTZ − 90 ) )
        POSX = POSX − ( KL * VITVOL * sin( ROTZ − 90 ) )
```

As in the previous embodiments, the isometric actions could equally be effected by means of a potentiometer or a nail type force sensor.

There will now be described with reference to FIGS. 16 and 17 another type of application of the present invention, in which navigation no longer consists in exploring or moving around in a virtual space, but instead in manipulating and inspecting an object in three dimensions in a virtual space.

It is a question in particular of moving an object in accordance with its six degrees of freedom using the navigation device 10 in order to be able to observe it in its entirety.

In practice, in this type of navigation, it must be possible to turn the object on itself, in all directions, and also to move it as naturally and easily as possible.

As before, a navigation device 10 is used integrating an isotonic sensor with three degrees of freedom and an isometric sensor with three degrees of freedom that is decorrelated from the isotonic sensor.

As previously explained, an isometric sensor with three degrees of freedom can be obtained by using a nail type force sensor sensitive to forces exerted along the three axes X, Y and Z associated with the navigation device.

As previously explained, whereas the forces exerted along the axes X and Y of the horizontal plane are bidirectional, the force exerted along the vertical axis Z on the force sensor is unidirectional. In order to complement the isometric sensor and to obtain three degrees of freedom, at least one complementary push-button is associated with the nail type force sensor.

Figure 16:
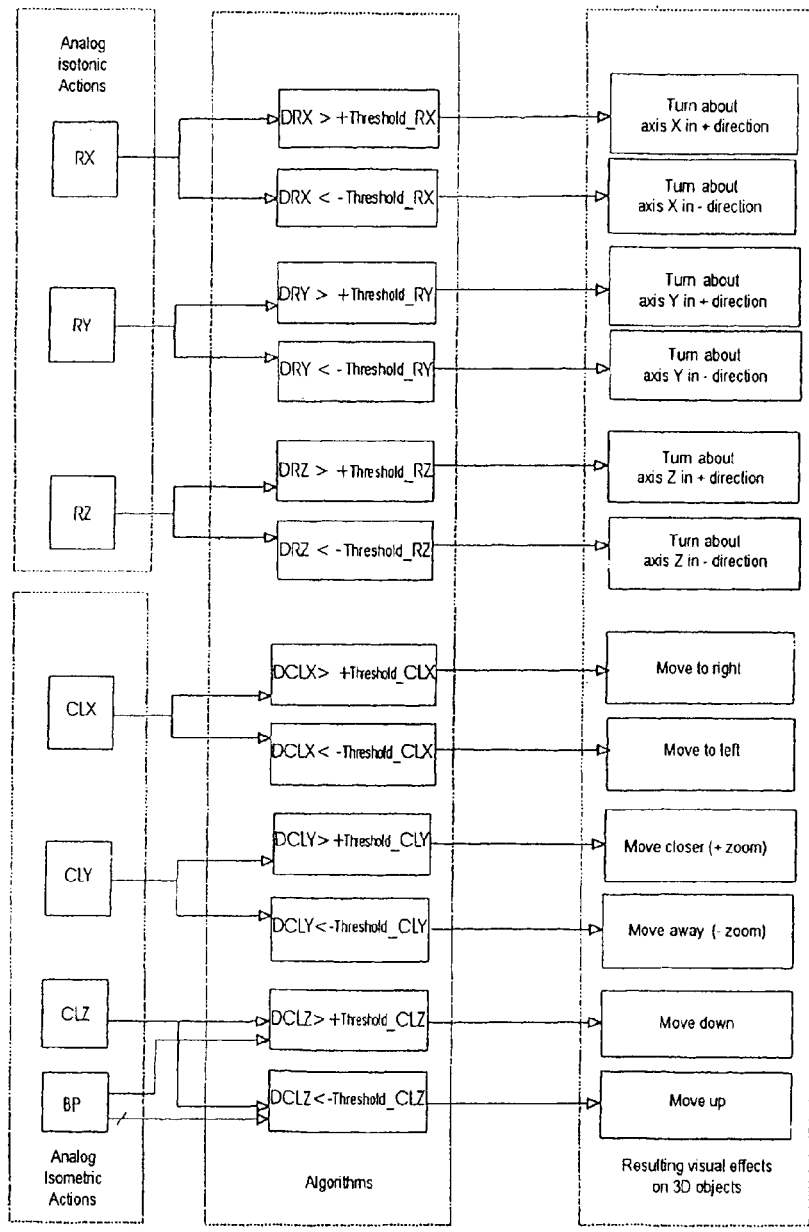
FIGS. 16 and 17 illustrate processing algorithms used by the processing means of the navigation system from FIG. 5 for the manipulation of objects having three dimensions in a virtual space.

In a first embodiment as shown in FIG. 16, the visualization of the object is effected by small, so-called relative movements. It is instantaneous the difference between the instantaneous position and the rest position that defines the movements of the object.

The modifications in space of the navigation device 10 around the axes X, Y and Z directly control actions for turning the object to be visualized about the axes X, Y and Z, respectively.

In parallel with these three rotations effected in the virtual space, the isometric device controls three bidirectional translations in that space.

As shown in FIG. 16, the application of a force to the force sensor in the direction X controls a movement of the object toward the right or the left, for example.

Similarly, a movement on the force sensor along the perpendicular axis Y controls a zoom function consisting in moving toward or away from the object.

The final movement in the third dimension of the space, downward or upward, is effected by means of an action on the force sensor, exerted along the vertical axis Z and coupled to action or non-action on the push-button.

Thus in the embodiment shown, if the user operates the push-button and at the same time exerts a force on the sensor in the direction Z, downward movement is effected. A contrario, if the push-button is not operated and action applied only to the force sensor along the axis Z, upward movement is effected.

Moreover, all of these movements are gradual and can depend on the intensity of the force exerted on the sensor in the three directions X, Y and Z.

In this case, and in contrast to previous methods, it is the position and rotation angle coordinates of the visualized object that are used and modified, and not the coordinates of the camera, corresponding to the point of view of the user.

Figure 17:
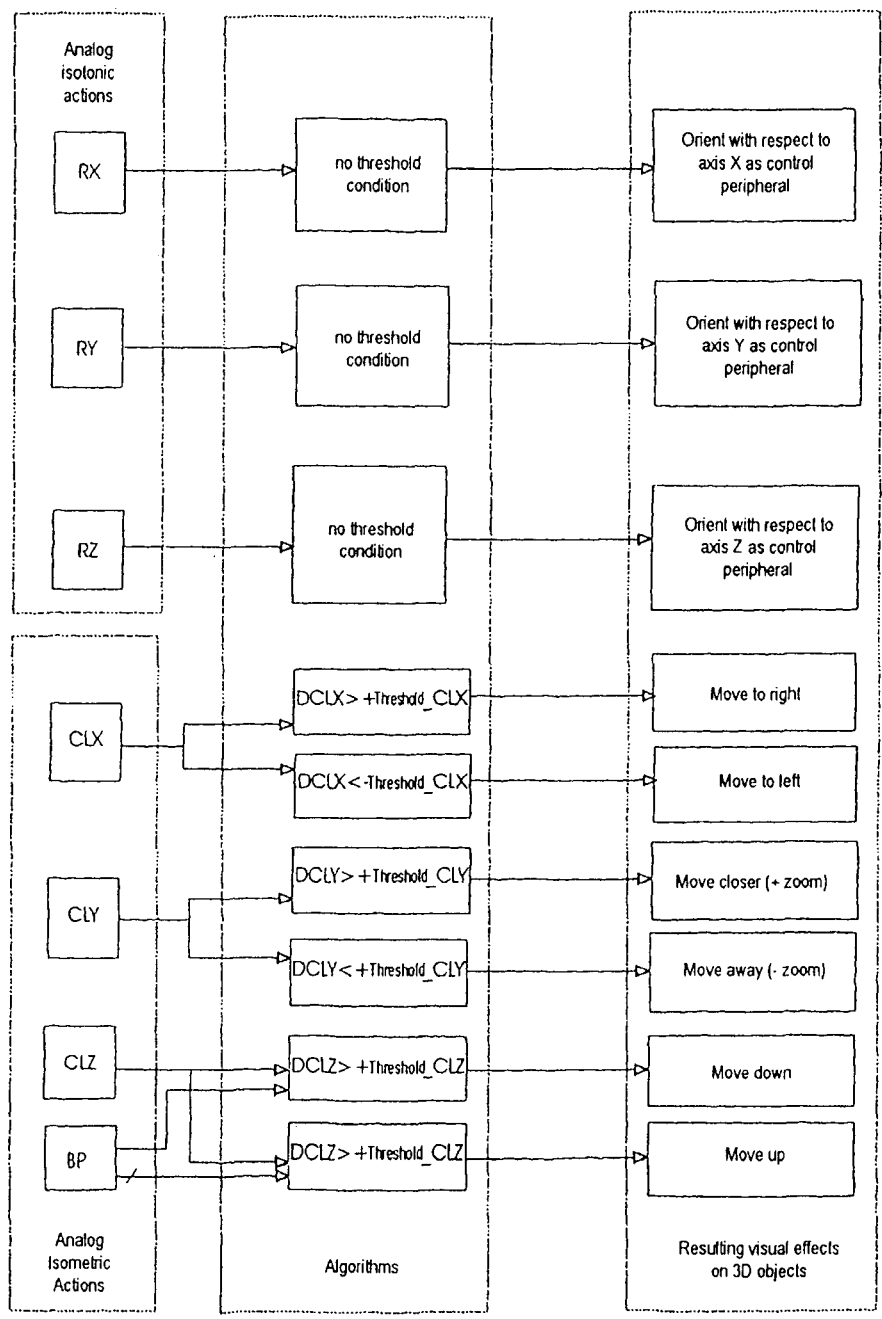

A second embodiment is shown in FIG. 17.

It is a question here of effecting both absolute and relative checks on the movements of the navigation device 10. In this embodiment, the absolute checks are effected on the rotation angles associated with the visualized object and the relative checks on the axial movements.

Thus the angular orientation of the object is similar to that imparted by the user to the navigation device 10. On the other hand, movements in translation controlled by the isometric devices are identical to those described hereinabove.

In this type of navigation, a variant consists in no longer applying the movement and orientation values to the visualized object but instead to a camera adapted to be moved around the object.

A processing algorithm enabling simultaneous rotation and lateral movement of the camera is similar to the example thereof given previously for the helicopter type mode of navigation, in which drift and rotation of the camera are combined simultaneously.

Of course, these examples of navigation in a virtual space are given by way of nonlimiting example only.

In parallel with this navigation in a virtual space effected on a computer, for example, the invention applies equally to the manipulation and inspection of a real object in a real space.

In particular, it may be applied to controlling a remote-controlled aircraft or boat, or a drone type aircraft.

Figure 18:
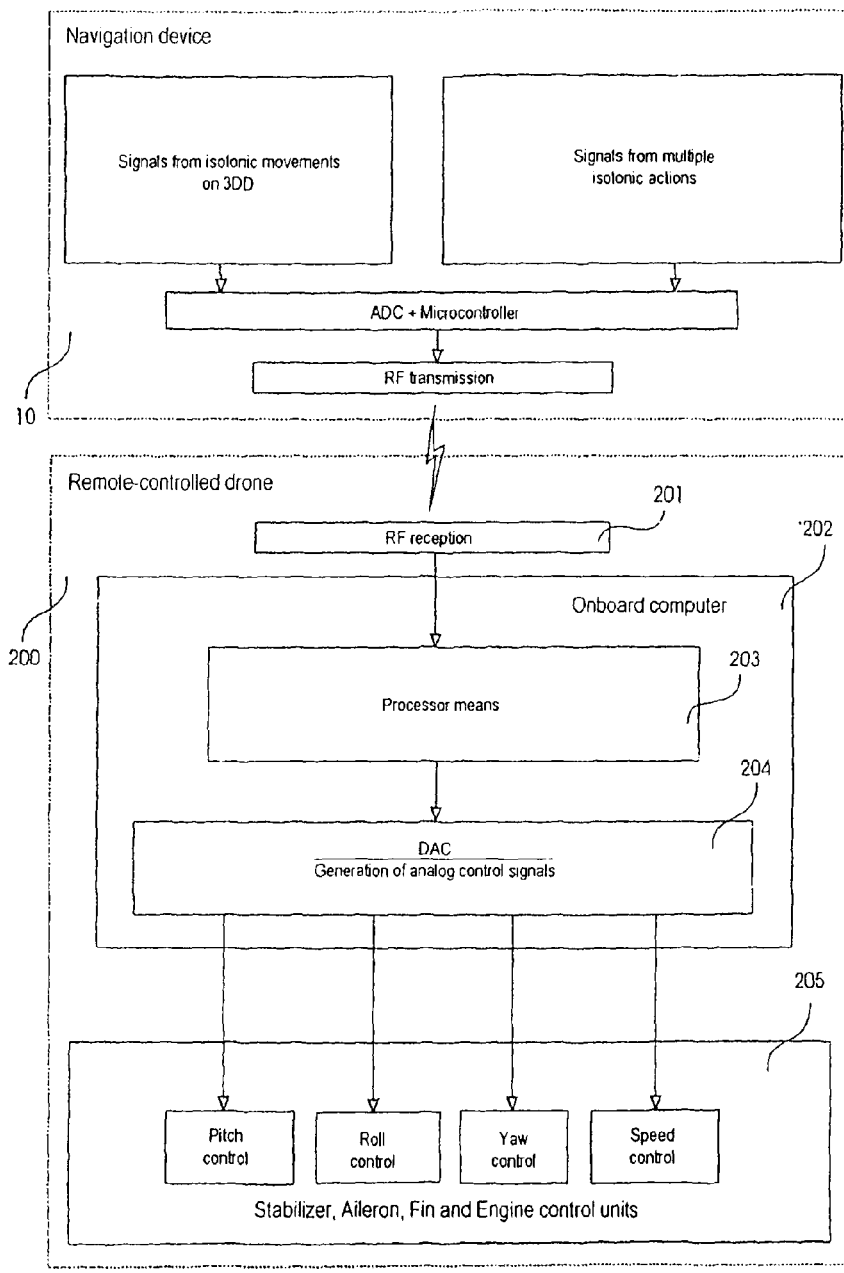
FIG. 18 is a block schematic illustrating a navigation system conforming to the invention applied to the control of a remote-controlled object.

FIG. 18 shows a navigation system using a navigation device 10 as described hereinabove with reference to FIG. 1 in particular that will not be described again here.

The data transmitted by the navigation device 10 is in this application transmitted directly to reception means 201 of a remote-controlled drone 200.

An onboard computer 202 includes processor means 203 adapted to execute a processing algorithm which, starting from received and merged data, is adapted to calculate rotation angles RX, RY, and RZ of the navigation device in order to determine the actions to be effected on the various controls of the drone.

In practice, a conversion device 204 is provided in the onboard computer in order to generate analog control signals from digital signals supplied by the processor means 203.

The controls 205 of the drone can thus be controlled directly, consisting generally of stabilizers, ailerons, fins and the engine, in order to control the movement of the drone and in particular pitch, roll and yaw and the speed at which it moves.

Figure 19:
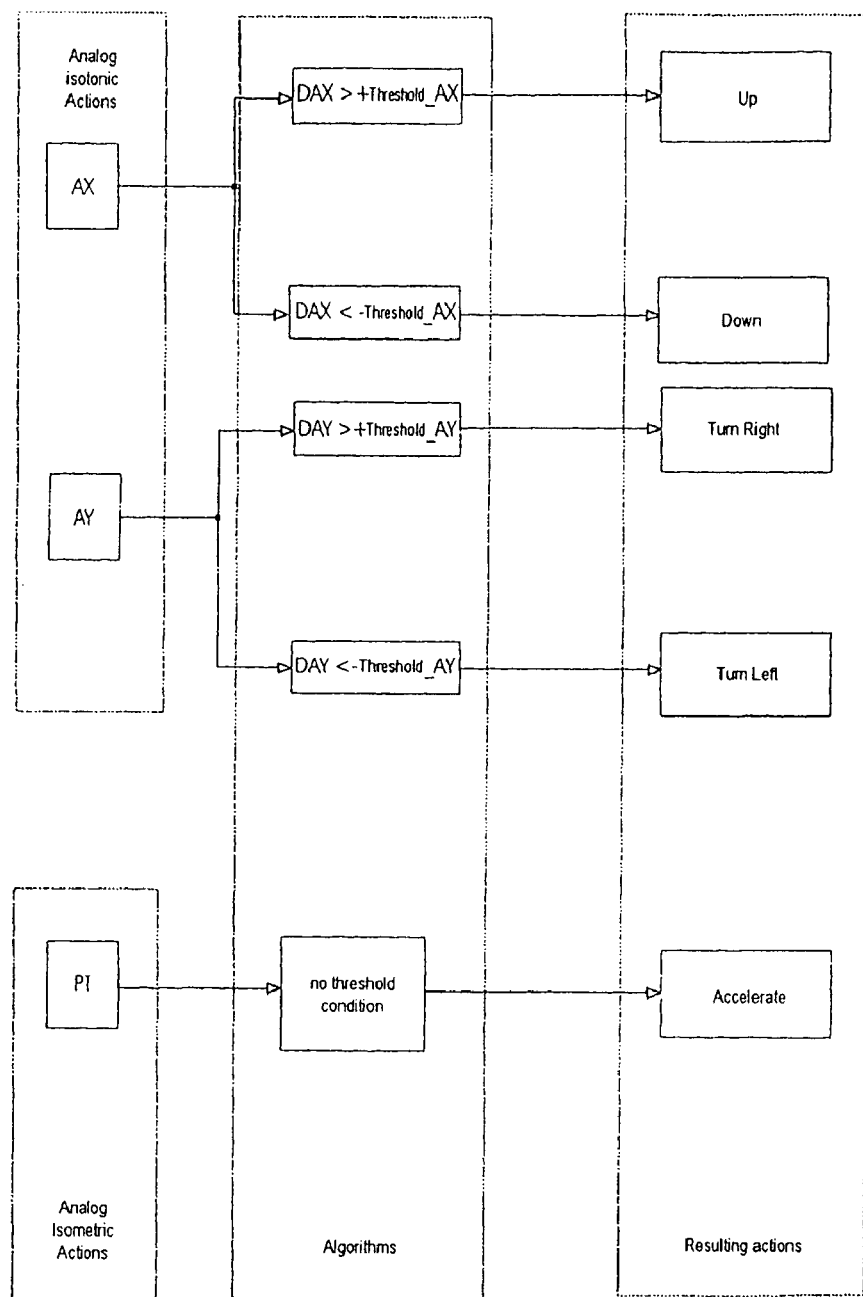
FIGS. 19 and 20 illustrate processing algorithms used by the processing means of the navigation system from FIG. 18 for piloting a remote-controlled object of the drone type.
Figure 20:
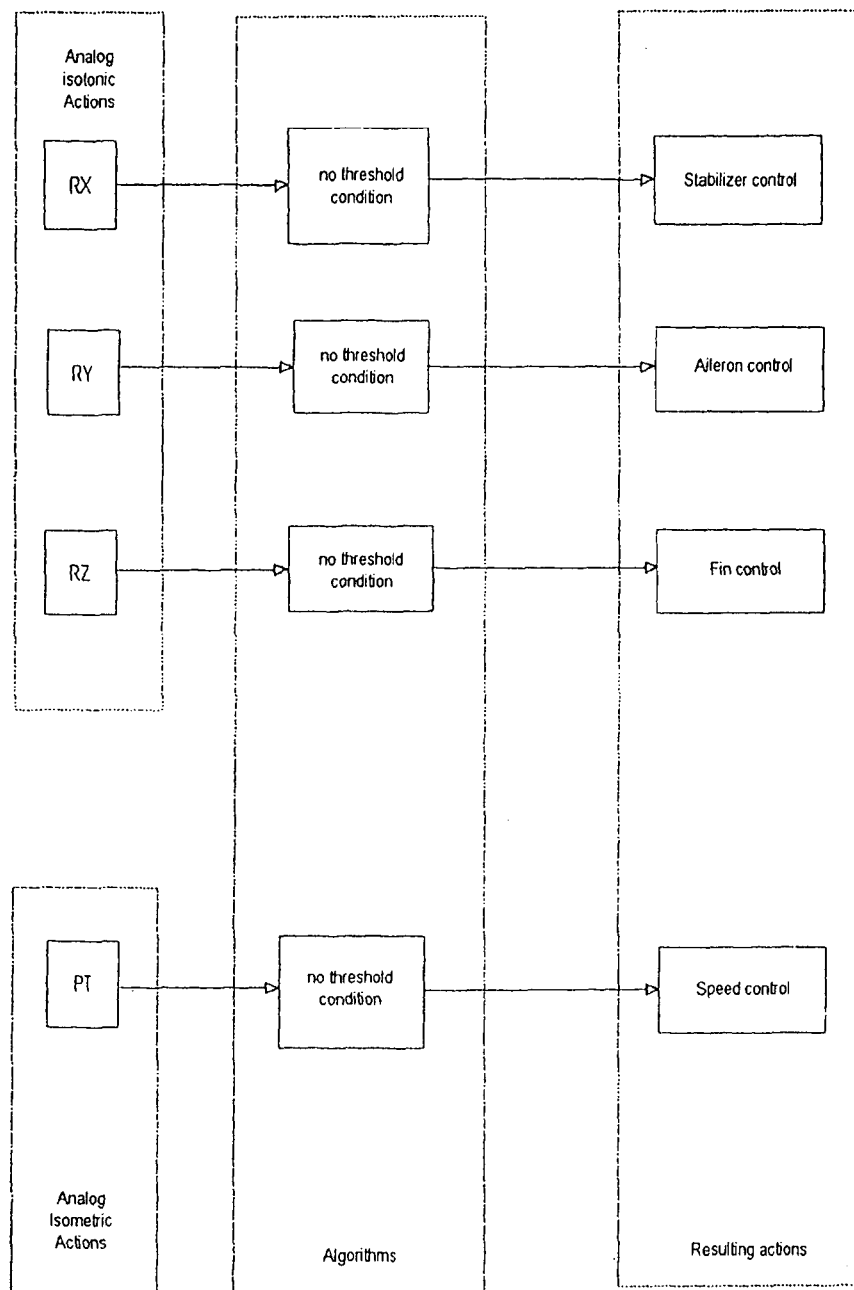

A drone may be piloted by means of two types of control as shown in FIGS. 19 and 20.

In the first case, it is a question of enabling a novice user to pilot the drone.

In particular, the actions of rising and descending may be controlled by modifying the position of the navigation device 10 relative to the axis X. The voltage of the stabilizers is modified in accordance with a proportional function depending on the action applied to the navigation device 10.

Thus the voltage of the stabilizer will depend on the input data DeltaAX, for example.

Likewise, to effect a rotation toward the right or toward the left of the drone, a proportional function depending on the inclination about the axis Y of the navigation device 10 may be used so that the voltage of the right aileron, the voltage of the left aileron and the voltage of the fin are respective proportional functions of the input data DeltaAY.

In parallel with these actions controlled by the rotation of the navigation device 10, an action on an isometric device, and for example a potentiometer PT, controls the acceleration and the speed of the drone, in accordance with a proportional function depending on the value DeltaPT.

In another embodiment as shown in FIG. 20, the mode of piloting the drone may be of the expert type and reserved to an experienced user provided that the actions applied to the navigation device 10, and in particular the inclination angles RX, RY and RZ of the device, are applied directly to the control of the stabilizer, the ailerons and the fin.

In particular, the voltage of the stabilizer may be a proportional function depending on RX, the voltage of the ailerons may be a proportional function depending on RY, and the voltage of the fin may be a proportional function depending on the value RZ.

As before, the speed of the drone may be controlled by means of a proportional function depending on the value of the potentiometer.

Thus the present invention can control a flying object, of aircraft type, in a real space. The navigation device could equally be used to control the movement of a boat on the water, the concepts of "up" or "down", modifying the altitude, then being eliminated.

Of course, numerous modifications may be made to the embodiments described hereinabove without departing from the scope of the invention.

In particular, although there has been described hereinbefore a navigation device dedicated to navigation in a space having three dimensions, that navigation device may further include means for pointing in a virtual space having two dimensions, such as the standard means equipping a computer mouse. Switching means, of the two-position button type, may be used to switch from an operating mode in which the device is manipulated by the user, to detect inclination of the casing, and thus navigation in a space having at least three dimensions, and a second mode of operation in which the device operates as a pointer in a virtual space having two dimensions, for example being moved over a work surface.

The invention claimed is:

1. A stand-alone device for navigating in a space having at least three dimensions, comprising a casing adapted to be manipulated by a user, the casing incorporating:
   isotonic sensors for generating signals representing the inclination of the casing with respect to its pitch, roll and yaw axes;
   at least one isometric device adapted to be operated by a finger of the user while holding the casing in one hand, the isometric device being sensitive to a force exerted by the user's finger along at least two axes of the isometric device, and being adapted to generate a control signal for controlling at least one bidirectional translation with respect to at least one axis of the space, wherein the control signal comprises a signal representing the force exerted by the user's finger along one axis of the at least two axes of the isometric device; and
   processor means for generating signals for controlling at least one bidirectional rotation in the space from the signals representing the inclination of the casing and signals for controlling at least one bidirectional translation in the space from the control signal generated by the isometric device,
   the isotonic sensors and the isometric device being decoupled from each other, thereby decoupling the rotational movement and the translation movement when navigating in the space.

2. The stand-alone navigation device according to claim 1, wherein the isometric device is sensitive to a force exerted along three axes of the at least one isometric device and is adapted to generate signals for controlling a movement with respect to three axes of the space.

3. The stand-alone navigation device according to claim 1, wherein the isotonic sensors for generating signals representing the inclination of the casing comprise at least two accelerometers and two magnetometers.

4. The stand-alone navigation device according to claim 1 further comprising means for pointing in a virtual space having two dimensions and means for switching a mode of operation between a first mode in which the device is manipulated by a user to detect the inclination of the casing and a second mode in which the device operates as a pointer in a virtual space having two dimensions.

5. The stand-alone navigation device according to claim 1 wherein the casing comprises a substantially parallelepipedal shape, and wherein the at least one isometric device is disposed on an upper face of the casing and is adapted to be operated by a thumb of the user while holding casing in one hand.

6. The stand-alone navigation device according to claim 1 wherein the casing comprises a substantially parallelepipedal shape, and wherein the at least one isometric device is disposed on a lateral face of the casing.

7. A navigation system for navigating in a space having at least three dimensions comprising a device according to claim 1.

8. The navigation system according to claim 7, wherein the signals representing the inclination of the casing are adapted to generate three bidirectional movements in the space.

9. The navigation system according to claim 8, wherein the signals representing the inclination of the casing are further adapted to generate signals for controlling bidirectional rotation in the space.

10. The navigation system according to claim 7, wherein the control signal is adapted to generate movements with respect to three axes of the space.

11. The navigation system according to claim 10, wherein the control signal is adapted to generate a movement in the space depending on the force exerted along the one axis.

12. The navigation system according to claim 11, wherein the movement in the space depends on a comparison of the signal representing the force exerted along the one axis with a predetermined threshold value.

13. A navigation method in a space having at least three dimensions, the method comprising the following steps:
acquiring signals generated by isotonic sensors incorporated into a casing, the signals representing an inclination of the casing with respect to pitch, roll and yaw axes;
acquiring a control signal for controlling at least one bidirectional translation with respect to at least one axis of the space, wherein the control signal is generated by an isometric device incorporated in the casing, the isometric device being adapted to be operated by a finger of a user while holding the casing in one hand and being sensitive to a force exerted by the user's finger along at least two axes of the isometric device, the control signal comprising a signal representing the force exerted by the user's finger along one axis of the at least two axes of the isometric device;
generating at least one bidirectional rotation in the space from the signals representing the inclination of the casing; and
generating at least one bidirectional translation in the space from the control signal generated by the isometric device, the isotonic sensors and the isometric device being decoupled from each other, thereby decoupling the rotational movement and the translation movement when navigating in the space.

14. The navigation method according to claim 13 further comprising the steps of generating signals for controlling bidirectional rotation and bidirectional translation in the space from the signals representing the inclination of the casing and generating signals for controlling translation in the space from movement control signals generated by the isometric device.

15. The navigation method according to claim 13 further comprising the steps of generating signals for controlling two bidirectional rotations and a bidirectional translation in the space from the signals representing the inclination of the casing and generating signals for controlling translation in the space from the movement control signals generated by the isometric device.

16. The navigation method according to claim 13 further comprising the steps of generating signals for controlling a bidirectional rotation and two bidirectional translations in the space from the signals representing the inclination of the casing and generating signals for controlling bidirectional translation in the space from the movement control signals generated by the isometric device.

17. The navigation method according to claim 13 further comprising the steps of generating signals for controlling three bidirectional rotations in the space from the signals representing the inclination of the casing and generating signals for controlling translation in the space from the movement control signals generated by the isometric device.

18. The navigation method according to claim 13 further comprising the steps of generating signals for controlling three bidirectional rotations in the space from the signals representing the inclination of the casing and generating signals for controlling three bidirectional translations in the space from the movement control signals generated by the isometric device.

* * * * *